(12) United States Patent
Takase et al.

(10) Patent No.: US 7,901,764 B2
(45) Date of Patent: *Mar. 8, 2011

(54) MULTI-LAYERED POLYLACTIC ACID RESIN FOAMED BODY AND MULTI-LAYERED POLYLACTIC ACID RESIN FOAMED MOLDED ARTICLE

(75) Inventors: Kenichi Takase, Utsunomiya (JP); Takashi Kawada, Kanuma (JP); Akira Iwamoto, Utsunomiya (JP)

(73) Assignee: JSP Corporation (JP)

( * ) Notice: Subject to any disclaimer, the term of this patent is extended or adjusted under 35 U.S.C. 154(b) by 1019 days.

This patent is subject to a terminal disclaimer.

(21) Appl. No.: 11/663,630

(22) PCT Filed: Sep. 30, 2005

(86) PCT No.: PCT/JP2005/018090
§ 371 (c)(1),
(2), (4) Date: Mar. 23, 2007

(87) PCT Pub. No.: WO2006/038548
PCT Pub. Date: Apr. 13, 2006

(65) Prior Publication Data
US 2010/0028654 A1    Feb. 4, 2010

(30) Foreign Application Priority Data

Oct. 4, 2004   (JP) ................... 2004-291401

(51) Int. Cl.
*B32B 5/18*    (2006.01)
*B32B 27/08*   (2006.01)
*B32B 27/32*   (2006.01)
*B32B 27/36*   (2006.01)
*C08G 63/12*   (2006.01)

(52) U.S. Cl. .............. 428/314.8; 428/304.04; 428/314.4; 428/315.5; 428/315.7; 428/318.4; 428/319.3; 428/480; 428/483; 521/50; 521/79; 521/97; 521/182

(58) Field of Classification Search .................. None
See application file for complete search history.

(56) References Cited

U.S. PATENT DOCUMENTS
6,037,384 A * 3/2000 Kakizawa et al. ............ 521/182
(Continued)

FOREIGN PATENT DOCUMENTS
EP   1 378 538   1/2004
(Continued)

*Primary Examiner* — Vivian Chen
(74) *Attorney, Agent, or Firm* — Bacon & Thomas, PLLC

(57) ABSTRACT

An object of the present invention is to provide a multi-layered polylactic acid resin foamed body of a crystalline polylactic acid resin which has good appearance and excellent mechanical strength such as bending strength and compressive strength and which is capable of being imparted with excellent heat resistance, and to provide a multi-layered polylactic acid resin foamed molded article having excellent appearance, heat resistance and mechanical strengh. The multi-layered polylactic acid resien foamed body of the present invention is a laminate having a polylactic acid resin foamed layer and a thermoplastic resin layer provided at least one side of the foamed layer, wherein the foamed layer has a cell shape satisfying specific conditions, wherein the difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) of the foamed layer as measured by heat flux differential scanning calorimetry at a heating rate of 2° C./min is less than 40 J/g, and wherein the endothermic calorific value ($\Delta H_{endo:2° C./min}$) is at least 10 J/g and the exothermic calorific value ($\Delta H_{exo:2° C./min}$) is at least 3 J/g.

8 Claims, 8 Drawing Sheets

U.S. PATENT DOCUMENTS

| | | | |
|---|---|---|---|
| 6,429,280 B1 * | 8/2002 | Hiraoka et al. | 528/354 |
| 6,432,525 B1 * | 8/2002 | Gokuraku et al. | 428/318.6 |
| 6,520,759 B2 * | 2/2003 | Kitayama et al. | 425/4 C |
| 6,566,345 B2 * | 5/2003 | Miller et al. | 514/54 |
| 6,815,047 B1 * | 11/2004 | Kitayama et al. | 428/314.8 |
| 7,265,160 B2 * | 9/2007 | Oka et al. | 521/50.5 |
| 7,645,810 B2 * | 1/2010 | Takase et al. | 521/98 |
| 7,727,606 B2 * | 6/2010 | Takase et al. | 428/36.5 |
| 2006/0091576 A1 * | 5/2006 | Takase et al. | 264/51 |
| 2006/0167122 A1 * | 7/2006 | Haraguchi et al. | 521/60 |
| 2010/0086758 A1 * | 4/2010 | Takase et al. | 428/219 |

FOREIGN PATENT DOCUMENTS

| | | | |
|---|---|---|---|
| JP | 2000-136259 | | 5/2000 |
| JP | 2002-3709 | | 1/2002 |
| JP | 2002-003709 | * | 1/2002 |
| JP | 2002-322309 | | 11/2002 |
| JP | 2003-183433 | * | 7/2003 |
| JP | 2004-183433 | | 7/2003 |
| JP | 2003-313344 | * | 11/2003 |
| JP | 2004-059819 | * | 2/2004 |
| JP | 2004-083890 | | 3/2004 |
| JP | 2004-359910 | * | 12/2004 |
| JP | 2005-154563 | * | 6/2005 |
| JP | 2006-103098 | * | 4/2006 |

* cited by examiner

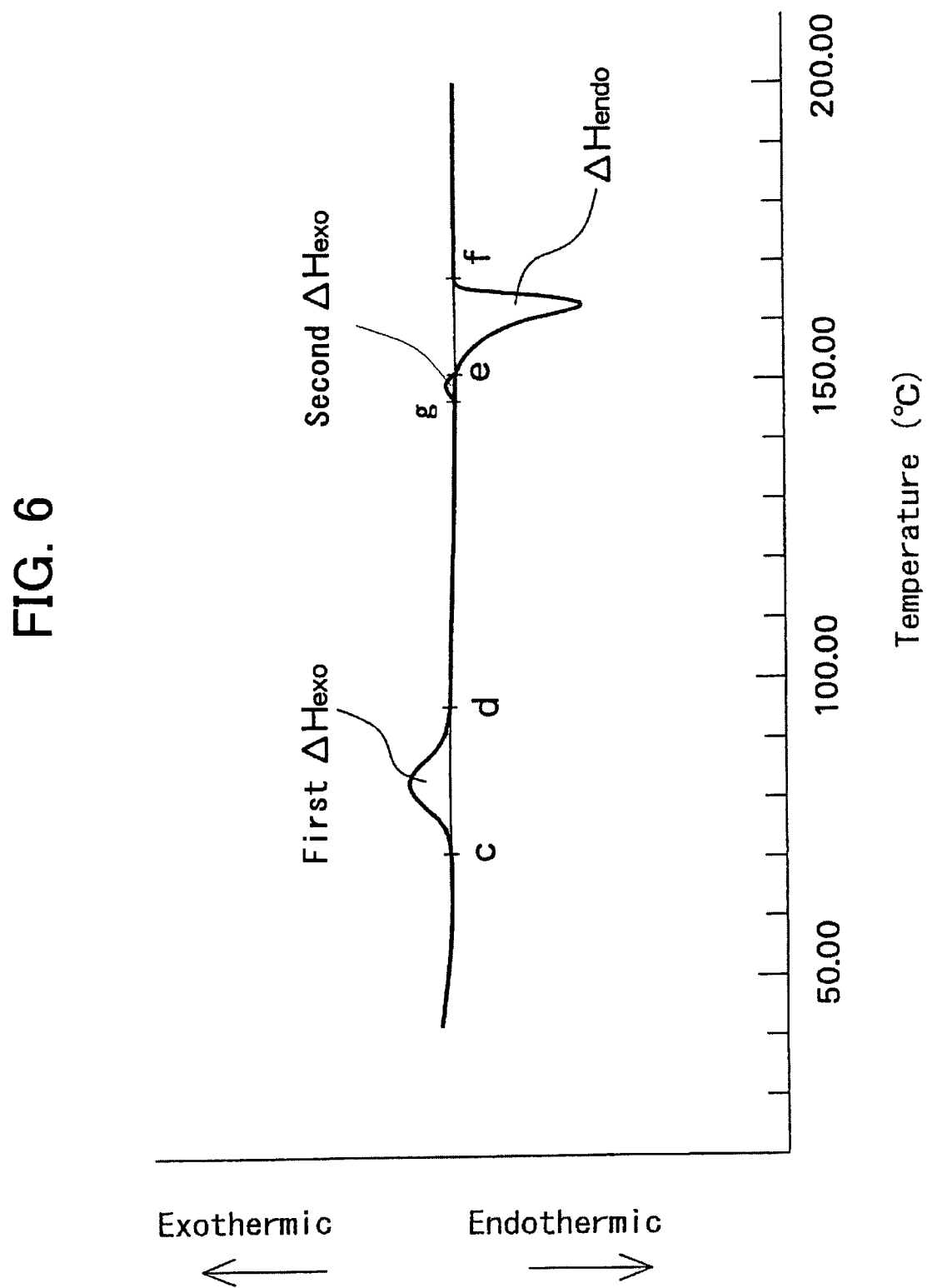

MULTI-LAYERED POLYLACTIC ACID RESIN FOAMED BODY AND MULTI-LAYERED POLYLACTIC ACID RESIN FOAMED MOLDED ARTICLE

TECHNICAL FIELD

This invention relates to a multi-layered, sheet-like or plate-like foamed body of a polylactic acid resin, to a multi-layered polylactic acid resin foamed body for thermoforming, and to a multi-layered polylactic acid resin foamed molded article.

BACKGROUND ART

Foamed bodies of generally employed resins such as polyethylene, polypropylene and polystyrene resins have been conventionally used in various fields because of their light-weight properties, good heat insulating and cushioning properties. Since these foamed bodies of generally employed resins are hardly decomposed when allowed to stand in natural environment after uses, a number of techniques of recovery and recycling have been recently realized.

Recently, interest in global environment is increasing and environmental issues such as depletion of petroleum resources attract a lot of attention. In such circumstances, polylactic acid resins which are environmentally low-load plastics are now drawn much attention in place of conventional plastics derived from petroleum resources. Polylactic acid resins are capable of being produced from plant such as corn as a raw material and decomposed into carbon dioxide and water, when left in the natural environment. Therefore, such polylactic acid resins are inferred to be used more generally. Foamed bodies made from polylactic acid resins are being developed in the same way as that of conventional general-use resins.

However, a known polylactic acid resin foamed sheet (Patent Document 1) uses a non-crystalline polylactic acid resin and, therefore, has a problem in heat resistance though it has good moldability. In particular, the foamed sheet is deformed even at room temperature. A crystalline polylactic acid, on the other hand, has good heat resistance but has a problem in foamability and thermoformability. With a crystalline polylactic acid, therefore, it is difficult to produce sheet-like or plate-like foamed bodies having the same functions as those of the conventionally used sheet-like or plate-like polystyrene resin foamed bodies. Even when foamed sheets are prepared, crystalline polylactic acid resin foamed sheets (Patent Documents 2 and 3) have poor thermoformability. Further, it is not easy to thermoform such sheets also because of a high apparent density, non-uniform cell shapes and a low closed cell content. Even when molded articles are obtained, there is a room to improve mechanical strength such as tensile strength and compressive strength.

Patent Document 1: Japanese Unexamined Patent Publication No. JP-A-2002-322309 (claims)
Patent Document 2: Japanese Unexamined Patent Publication No. JP-A-2002-3709 (claims)
Patent Document 3: Japanese Unexamined Patent Publication No. JP-A-2000-136259 (claims)

DISCLOSURE OF THE INVENTION

Problems to be Solved by the Invention

It is an object of the present invention to provide a multi-layered polylactic acid resin foamed body of a crystalline polylactic acid resin which has good appearance and excellent mechanical strength such as bending strength and compressive strength and which is capable of being imparted with excellent heat resistance, to provide a multi-layered polylactic acid resin foamed body having excellent thermoformability, to provide a multi-layered polylactic acid resin foamed body obtained by heat treating the above multi-layered polylactic acid resin foamed body and having excellent heat resistance and mechanical strength, and to provide a multi-layered polylactic acid resin foamed molded article.

Means for Solving the Problems

In accordance with the present invention, polylactic acid resin foamed body, etc. shown below are provided.

[1] A multi-layered polylactic acid resin foamed body which is a laminate comprising a polylactic acid resin foamed layer and a thermoplastic resin layer provided at least one side of said foamed layer, wherein said foamed layer has such a cell shape as to satisfy the following formulas (1) to (3):

$$0.05 < Z < 2.0 \quad (1)$$

$$0.2 < Z/X < 1.4 \quad (2)$$

$$0.2 < Z/Y < 1.7 \quad (3)$$

where X, Y and Z represent average cell diameters in the extrusion, transverse and thickness directions, respectively, in the unit of mm, wherein a difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) of said foamed layer as measured by heat flux differential scanning calorimetry at a heating rate of 2° C./min is less than 40 J/g and wherein the endothermic calorific value ($\Delta H_{endo:2° C./min}$) is at least 10 J/g and the exothermic calorific value ($\Delta H_{exo:2° C./min}$) is at least 3 J/g.

[2] A multi-layered polylactic acid resin foamed body as recited in [1] above, wherein the difference ($\Delta H_{endo:2° C./min} - \Delta H_{exo:2° C./min}$) is less than 30 J/g and wherein the endothermic calorific value ($\Delta H_{endo:2° C./min}$) is at least 20 J/g and the exothermic calorific value ($\Delta H_{exo:2° C./min}$) is at least 5 J/g.

[3] A multi-layered polylactic acid resin foamed body as recited in [1] above, wherein the difference ($\Delta H_{endo:2° C./min} - \Delta H_{exo:2° C./min}$) is less than 20 J/g and wherein the endothermic calorific value ($\Delta H_{endo:2° C./min}$) is at least 25 J/g and the exothermic calorific value ($\Delta H_{exo:2° C./min}$) is at least 15 J/g.

[4] A multi-layered polylactic acid resin foamed body as recited in [1] above, wherein said foamed layer has a thickness of 0.5 to 7 mm and has such a cell shape as to satisfy the following formulas (4) to (6):

$$0.05 < Z < 0.8 \quad (4)$$

$$0.2 < Z/X < 0.8 \quad (5)$$

$$0.2 < Z/Y < 0.6 \quad (6)$$

where X, Y and Z represent average cell diameters in the extrusion, transverse and thickness directions, respectively, in the unit of mm.

[5] A multi-layered polylactic acid resin foamed body as recited in [1] above, wherein the foamed layer has an exothermic calorific value ($\Delta H_{exo:2° C./min}$), as measured by heat flux differential scanning calorimetry at a cooling rate of 10° C./min, of 20 to 45 J/g.

[6] A multi-layered polylactic acid resin foamed body as recited in [1] above, wherein the foamed layer has an exothermic calorific value ($\Delta H_{exo:2° C./min}$), as measured by heat flux differential scanning calorimetry at a cooling rate of 10° C./min, of 25 to 40 J/g.

[7] A multi-layered polylactic acid resin foamed body as recited in [1] above, wherein the foamed layer has a melt tension of at least 2 cN at 190° C.

[8] A multi-layered polylactic acid resin foamed body as recited in [1] above, wherein the thermoplastic resin layer is a polyolefin resin layer.

[9] A multi-layered polylactic acid resin foamed body as recited in [1] above, wherein the thermoplastic resin layer is a polyester resin layer.

[10] A multi-layered polylactic acid resin foamed body which is a laminate obtained by heat treating a multi-layered polylactic acid resin foamed body according to any one of [1] to [9] above at a temperature not lower than the (glass transition temperature of said foamed layer plus 5° C.) but not higher than the (glass transition temperature of said foamed layer plus 70° C.), wherein the difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) of the foamed layer of said laminate as measured by heat flux differential scanning calorimetry at a heating rate of 2° C./min is at least 10 J/g and is greater by at least 3 J/g than the difference ($\Delta H_{endo:2° C./min} - \Delta H_{exo:2° C./min}$) of the multi-layered polylactic acid resin foamed body before the heat treatment.

[11] A multi-layered polylactic acid resin foamed body as recited in [10] above, wherein the difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) of the foamed layer of said laminate as measured by heat flux differential scanning calorimetry at a heating rate of 2° C./min is at least 25 J/g and is greater by at least 15 J/g than the difference ($\Delta H_{endo:2° C./min} - \Delta H_{exo:2° C./min}$) of the multi-layered polylactic acid resin foamed body before the heat treatment.

[12] A multi-layered polylactic acid resin foamed molded article obtained by thermoforming a laminate comprising a polylactic acid resin foamed layer and a thermoplastic resin layer provided at least one side of said foamed layer, wherein a difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) of said foamed layer as measured by heat flux differential scanning calorimetry at a heating rate of 2° C./min is at least 10 J/g.

[13] A multi-layered polylactic acid resin foamed molded article as recited in [12] above, wherein the difference ($\Delta H_{endo:2° C./min} - \Delta H_{exo:2° C./min}$) between an endothermic calorific value ($\Delta H_{endo:2° C./min}$) and an exothermic calorific value ($\Delta H_{exo:2° C./min}$) of said foamed layer as measured by heat flux differential scanning calorimetry at a heating rate of 2° C./min is at least 25 J/g.

EFFECT OF THE INVENTION

According to the present invention there is provided a multi-layered polylactic acid resin foamed body which is a laminate having a polylactic acid resin foamed layer and a thermoplastic resin layer, wherein the cell shape of the foamed layer satisfies specific conditions and wherein an endothermic calorific value and an exothermic calorific value ($\Delta H_{exo:2° C./min}$) of the foamed layer satisfy specific conditions. As a consequence, the foamed body has excellent mechanical strength and can give a multi-layered polylactic acid resin foamed body having excellent heat resistance by being subjected to a heat treatment as a succeeding step.

Also, the present invention provides a multi-layered polylactic acid resin foamed body and a multi-layered polylactic acid resin foamed molded article having excellent mechanical strength such as rigidity and heat resistance.

BRIEF DESCRIPTION OF THE DRAWINGS

FIG. 6 is a further explanatory view of a DSC curve showing $\Delta H_{exo:2° C./min}$ and $\Delta H_{endo:2° C./min}$ of a foamed layer as determined by a heat flux differential scanning calorimeter;

Figure 1:
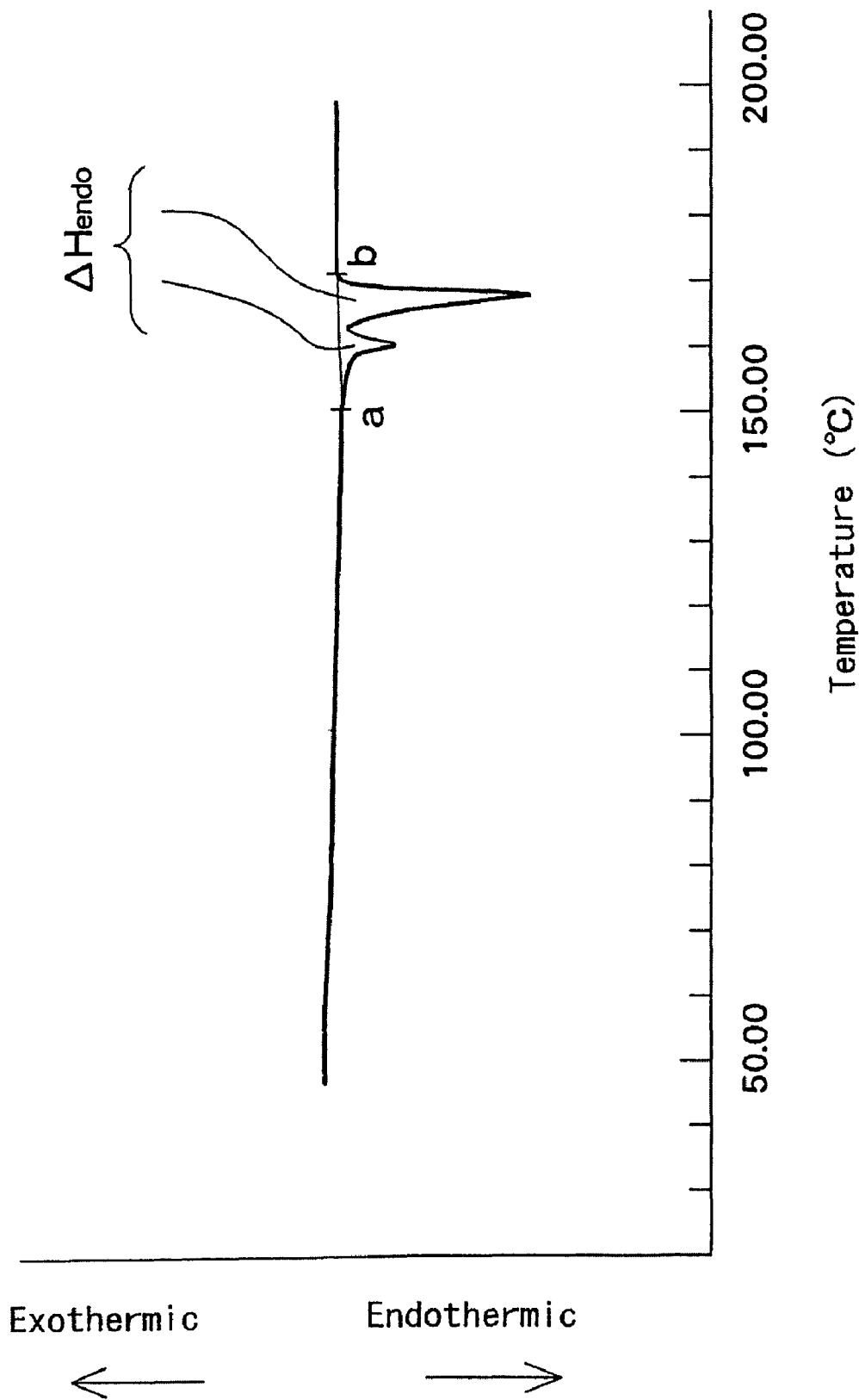
FIG. 1 is an explanatory view of a DSC curve showing $\Delta H_{end:raw}$ of a polylactic acid resin as determined by a heat flux differential scanning calorimeter.

EXPLANATION OF SYMBOLS 1 foamed layer
2, 2$a$, 2$b$ resin layer
3 adhesive layer

BEST MODE FOR CARRYING OUT THE INVENTION

A multi-layered polylactic acid resin foamed body (hereinafter referred to simply as "multilayer foamed body") of the present invention is a laminate which comprises a polylactic acid resin foamed layer and a thermoplastic resin layer provided at least one side of the foamed layer. The multilayer foamed body may be a sheet-like or plate-like body and may be used mainly as a display material or an indicator panel and, after being subjected to a secondary fabrication such as thermoforming, cutting and assembling, as a receptacle or a packaging material. Thus, the multilayer foamed body may be applied to uses to which the conventional polystyrene resin foamed sheets are applied.

Description will be first made of the polylactic acid resin foamed layer. The polylactic acid resin foamed layer (hereinafter referred to simply as "foamed layer") constituting the multilayer foamed body of the present invention comprises a base resin containing a polylactic acid resin as its major component. The term "polylactic acid resin" as used herein is intended to refer to a polymer containing at least 50% by weight of lactic acid components. Examples of the polylactic acid resin include (1) a homopolymer of lactic acid, (2) a copolymer of lactic acid with an aliphatic hydroxycarboxylic acid or acids other than lactic acid, (3) a copolymer of lactic acid with an aliphatic polyhydric alcohol or alcohols and an aliphatic polycarboxylic acid or acids, (4) a copolymer of lactic acid with an aliphatic polycarboxylic acid or acids, (5) a copolymer of lactic acid with an aliphatic polyhydric alcohol or alcohols, and (6) a mixture of any combination of two or more of (1) to (5) above. Specific examples of the lactic acid include L-lactic acid, D-lactic acid, DL-lactic acid, cyclic dimers thereof (a L-lactide, D-lactide or DL-lactide), and mixtures of the above.

Among the above-described polylactic acid resins, the polylactic acid resin preferably used in the present invention is one which has an endothermic calorific value $\Delta H_{endo:raw}$, as measured by hereinafter described heat flux scanning differential calorimetry, of at least 10 J/g, more preferably at least 20 J/g, most preferably at least 30 J/g. The upper limit of the endothermic calorific value of the polylactic acid is not specifically limited but is generally about 65 J/g. The polylactic acid resin having an endothermic calorific value $\Delta H_{endo:raw}$ of at least 10 J/g may be, for example, a crystalline polylactic acid resin or a mixture of crystalline and non-crystalline polylactic acid resins selected to have an endothermic calorific value $\Delta H_{endo:raw}$ of at least 10 J/g.

The term "crystalline polylactic acid resin" as used herein is intended to refer to a polylactic acid resin having $\Delta H_{endo:raw}$ of more than 2 J/g. The crystalline polylactic acid resin generally has $\Delta H_{endo:raw}$ of 20-65 J/g. The term "non-crystalline polylactic acid resin" as used herein is intended to refer to a polylactic acid resin showing an endothermic peak having $\Delta H_{endo:raw}$ of 2 J/g or less, or a polylactic acid resin which shows no endothermic peak.

The term "endothermic calorific value $\Delta H_{endo:raw}$" as used herein is intended to refer to a value as determined by heat flux differential scanning calorimetry in accordance with JIS K7122-1987 except that 1 to 4 mg of the polylactic acid is used as test sample and that adjustment of the condition of the test sample and the measurement of the calorific value from a DSC curve thereof are carried out in the following manner.

Adjustment of the condition of the test sample and the measurement of the calorific value from a DSC curve thereof are carried out as follows. A test sample is charged in a pan of a DSC apparatus and heated to 200° C. and melted. After maintaining the sample at that temperature for 10 minutes, the sample is cooled to 125° C. at a cooling rate of 2° C./minute. The sample is maintained at 125° C. for 120 minutes and then cooled to 40° C. at a cooling rate of 2° C./minute. After the above-described heat treatment, the DSC curve is measured while heating the sample again at 2° C./minute to a temperature higher by about 30° C. than the temperature at which the endothermic peak ends.

Figure 2:
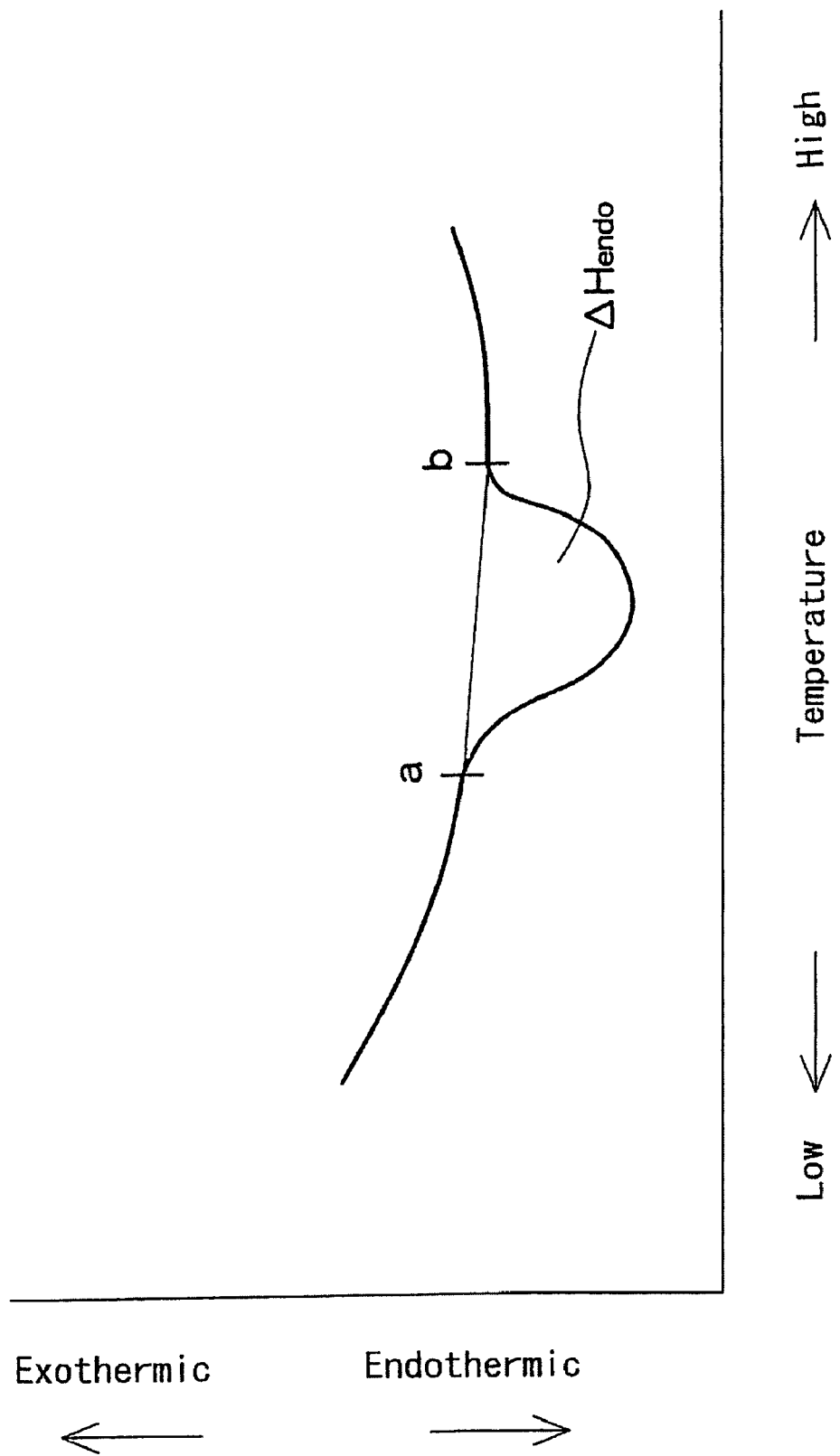
FIG. 2 is another explanatory view of a DSC curve showing $\Delta H_{end:raw}$ of a polylactic acid resin as determined by a heat flux differential scanning calorimeter.

The endothermic calorific value $\Delta H_{endo:raw}$ of the polylactic acid resin is determined as follows. Referring to FIG. 1, a point "a" is a point at which an endothermic peak of a DSC curve begins separating from a low temperature-side base line. A point "b" is a point at which the endothermic peak returns to a high temperature-side base line. The endothermic calorific value $\Delta H_{endo:raw}$ is a value obtained from the area defined by a line passing the points "a" and "b" and the DSC curve. The DSC device should be preferably operated so that each of the base lines is straight. When the base line or lines are inevitably curved, the points "a" and "b" are determined as follows. As shown in FIG. 2, a point at which the endothermic peak begins separating from the low temperature-side curved base line is the point "a". Similarly, the point "b" is a point where the endothermic peak returns to a curved base line on the high temperature-side.

In the measurement of the endothermic calorific value $\Delta H_{endo:raw}$, maintenance at 125° C. for 120 minutes is adopted for the adjustment of the conditions of the test sample, and cooling rate of 2° C./minute and heating rate of 2° C./minute are adopted for measuring the DSC curve. The reasons for these are to crystallize the polylactic acid resin test sample as much as possible for the purpose of measuring the endothermic calorific value $\Delta H_{endo:raw}$ of the sample in the completely crystallized or nearly completely crystallized state.

In the foamed layer of the present invention, the polylactic acid resin is the major component of the base resin thereof. Thus, the base resin may be composed of 100% by weight of the polylactic acid resin or of a mixture of at least 50% by weight but less than 100% by weight of the polylactic acid resin with not more than 50% by weight but not less than 0% by weight of a thermoplastic resin other than the polylactic acid resin. Namely, as long as the object and effect of the present invention are accomplished, a thermoplastic resin other than the polylactic acid resin may be added in an amount of less than 50% by weight.

However, when the base resin contains a thermoplastic resin other than the polylactic acid resin, the amount of the polylactic acid is preferably at least 70% by weight, more preferably at least 90% by weight. Examples of the thermoplastic resin other than the polylactic acid resin include a polyethylene resin, a polypropylene resin, a polystyrene resin and a polyester resin. Above all, the use of a aliphatic polyester resin containing at least 35 mol % of aliphatic ester component units is preferred. Examples of the aliphatic polyester resin include a polycondensation product of a hydroxyacid other than polylactic acid resins, a ring open polymerization product of a lactone (e.g. polycaprolactone), an aliphatic polyester or aliphatic copolyester such as polybutylene succinate, polybutylene adipate, polybutylene succinate adipate, and an aliphatic aromatic copolyester such as polybutylene adipate terephthalate.

As concrete examples of a method for producing the polylactic acid resin, there may be mentioned, but not limited thereto, a method in which lactic acid or a mixture of lactic acid and aliphatic hydroxycarboxylic acid is directly subjected to a dehydration polycondensation (U.S. Pat. No. 5,310,865); a method in which a cyclic dimer of lactic acid (lactide) is subjected to ring-open polymerization (U.S. Pat. No. 2,758,987); a method in which a cyclic dimer of an aliphatic hydroxycarboxylic acid (e.g. lactide or glycolide) and ε-caprolactone are subjected to ring-open polymerization in the presence of a catalyst (U.S. Pat. No. 4,057,537); a method in which lactic acid and a mixture of an aliphatic dihydric alcohol and an aliphatic dibasic acid are subjected to dehydrative polycondensation (U.S. Pat. No. 5,428,126); a method in which a lactic acid polymer and a polymer of an aliphatic dihydric alcohol and an aliphatic dibasic acid are subjected to condensation in an organic solvent (EP-A-0712880A2); and a method for producing a polyester polymer by dehydrative polycondensation of lactic acid in the presence of a catalyst, wherein solid phase polymerization is conducted in at least part of the production steps. The above methods may be performed in the presence of a minor amount of an aliphatic polyhydric alcohol (e.g. glycerin), an aliphatic polybasic acid (e.g. butanetetracarboxylic acid) or polyhydric alcohol (e.g. polysaccharide) to obtain a copolymer.

The foamed layer of the present invention may be prepared by an extrusion foaming method. The base resin containing a polylactic acid resin as a major component and a cell controlling agent are fed to an extruder and heated, melted and kneaded. A physical blowing agent is then fed under a pressure to the extruder and the mixture is further kneaded. The kneaded mass is then extruded through a die while controlling the resin temperature at a suitable foaming temperature, to foam the resin. As a die for use in the extrusion foaming, a circular die or a T-die may be used. A circular die is preferred for reasons of obtaining a foamed layer having a low apparent density and a large thickness. When the extrusion foaming is carried out using a circular die, a foamed body having a tubular foamed layer is obtained. The foamed body may be hauled and slid over a cylindrical cooling device and cut in the extrusion direction and opened to obtain a wide sheet-like foamed body. A plate-like foamed body may be obtained by, for example, passing a tubular foamed body between nip rolls to fuse-bond the interior walls thereof.

The blowing agent used for the production of the above foamed layer may be a physical blowing agent such as an aliphatic hydrocarbon, e.g. propane, n-butane, isobutane, n-pentane, isopentane and hexane; a halogenated aliphatic hydrocarbon, e.g. methyl chloride and ethyl chloride, or an inorganic gas such as carbon dioxide. Above all, n-butane, isobutane and carbon dioxide are preferred. A chemical blowing agent may be also used as a blowing agent for the production of the foamed layer of the present invention, if desired. However, for the production of a foamed layer having a low apparent density, the use of a physical blowing agent or a mixture of a physical blowing agent and a chemical blowing agent is preferred.

The foamed layer may contain an inorganic cell controlling agent such as talc or silica, or an organic cell controlling agent such as calcium stearate. One or more additives such as a colorant and an anti-oxidant may also be incorporated into the base resin as desired.

Incidentally, unlike a crystalline polylactic acid resin, a non-crystalline polylactic acid resin can give a foamed sheet having a low apparent density by a customarily employed extrusion foaming method. Further, since the non-crystalline polylactic acid resin foamed sheet shows good thermoformability, it is easy to produce foamed molded articles therefrom. However, since the rigidity of the non-crystalline polylactic acid resin is abruptly reduced when heated above the glass transition point thereof, the foamed sheet and the foamed molded articles cannot retain their shapes and are ill-suited for practical use with respect to the heat resistance. In contrast, when a specific polylactic acid resin is used as a polylactic acid resin constituting the major component of the base resin of the foamed layer of the present invention so as to control the crystalline state, it is possible to solve the problem of obtaining of good foamability and both good thermoformability and good heat resistance.

The foamed layer constituting the multi-layered polylactic acid resin foamed body of the present invention has preferably an apparent density of 63 to 630 kg/m$^3$ and a thickness of 0.5 to 15 mm. When the foamed layer has the above apparent density and thickness, the multilayer foamed body can exhibit excellent mechanical strength such as bending and compressive strength, heat insulating property, cushioning property and lightness in weight.

As used herein, the "apparent density of the foamed layer" is determined as follows. From the multilayer foamed body, a specimen of the foamed layer is cut. The apparent density is obtained by dividing the weight of the specimen by the volume thereof. The specimen should be cut to have as large a size as possible and to have a thickness nearly equal to that of the foamed layer.

The foamed layer of the multilayer foamed body of the present invention preferably has a thickness of 2 to 15 mm, more preferably 2.5 to 10 mm, particularly preferably 3 to 8 mm, when the multilayer foamed body is used as a plate-like multi-layered polylactic acid resin foamed body such as a display plate. When the multilayer foamed body is used as a material for thermoforming, the thickness of the foamed layer is preferably 0.5 to 7 mm, more preferably 0.5 to 5 mm, particularly preferably 0.7 to 3 mm, for reasons of moldability and mechanical strength of the obtained multi-layered polylactic acid resin foamed molded article.

As used herein, the "thickness of the foamed layer" is as determined by measuring the thickness of the foamed layer at every 50 mm interval throughout the width of the multilayer foamed body. The thickness of the foamed body is an arithmetic mean of the measured values.

Unlike a foamed layer made of a non-crystalline polylactic acid as a base resin, a difficulty, which is a fundamental problem different from the problems of thermal resistance and thermoformability, may arise in obtaining a foamed layer having an apparent density of 63 to 630 kg/m$^3$ and a thickness of 0.5 to 15 mm, when the foamed layer is made of a polylactic acid having an endothermic calorific value $\Delta H_{endo:raw}$ of at least 10 J/g as a base resin. Namely, it is difficult to adequately adjust the viscoelasticity of the molten, foamable composition for obtaining a foamed layer by extrusion foaming. For reasons of avoiding such a difficulty, it is preferred that the base resin used have a melt tension at 190° C. of at least 3 cN, more preferably at least 5 cN, still more preferably at least 8 cN. The upper limit of the melt tension is generally about 40 cN. When the melt tension is within the above range, a sufficient melt tension is obtainable at the time of foaming. Therefore, it is possible to obtain a satisfactory foamed layer having excellent mechanical strength, a low apparent density and a sufficient thickness.

The melt tension of the base resin tends to reduce when the base resin is subjected to extrusion foaming. Since the melt tension at 190° C. of the foamed layer obtained by extrusion foaming is lower than that of the base resin used for the preparation of the foamed layer, it is preferred that the melt tension of the foamed layer be at least 2 cN, more preferably at least 3 cN, particularly preferably at least 5 cN. The upper limit of the melt tension is generally about 40 cN.

A reduction of the melt tension of the base resin by the extrusion foaming is due to a thermal hysteresis and a shearing force of the base resin. Since a great reduction of the melt tension naturally results in a failure to obtain desired foamed body, excessive heating or shearing force should not be applied during extrusion foaming. When the melt tension of the foamed layer is held within the above range, it can be said that the extrusion foaming conditions adopted are proper.

The melt tension may be measured using Melt Tension Tester II (manufactured by Toyo Seiki Seisaku-Sho, Ltd.). More particularly, a melt tension tester having an orifice diameter of 2.095 mm and a length of 8 mm is used. The cylinder and orifice are set at a temperature of 190° C. A specimen (base resin or ground polylactic acid resin foamed layer) is charged into the cylinder and held therein for 5 minutes. The melt is then extruded in the form of a string under conditions including a resin temperature of 190° C. and a piston speed of 10 mm/minute from the orifice. The extruded resin string is put on a tension-detecting pulley having a diameter of 45 mm and is taken up on a roller having a diameter of 50 mm while increasing the take-up speed at a rate of about 5 rpm/sec (take-up acceleration of the resin string: $1.3 \times 10^{-2}$ m/sec$^2$). During the extrusion of the molten resin through the orifice in the form of a string, care should be taken to avoid intrusion of bubbles in the string.

The melt tension is determined as follows. The take-up speed is increased until the string put on the pulley breaks. The take-up speed R (rpm) when the string breaks is measured. Then, the string is taken up at a constant speed of 0.7×R (rpm) while measuring the melt tension of the string over time using a detector connected to the tension-detecting pulley.

Figure 3:
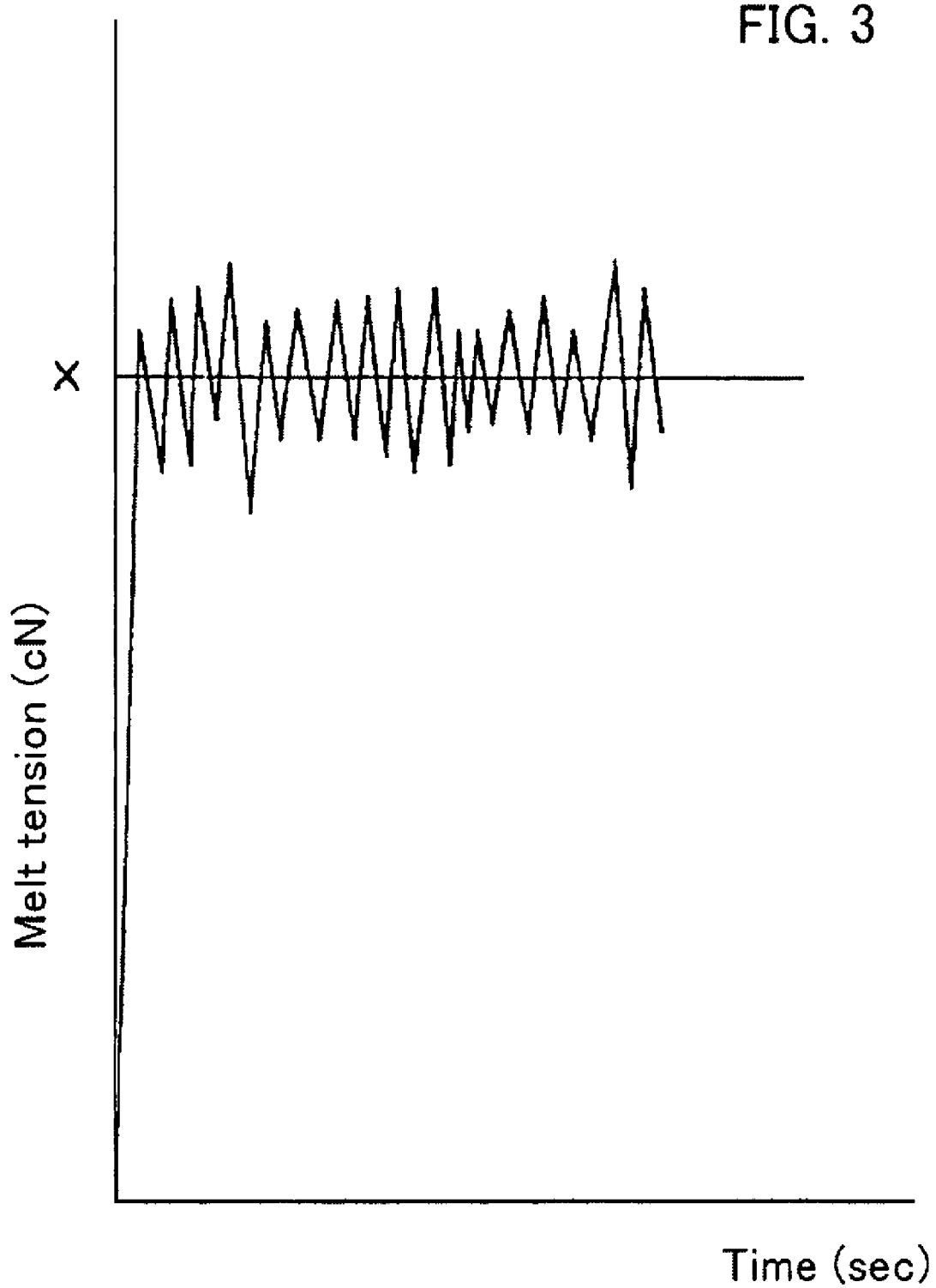
FIG. 3 is a graph explanatory of a method of determining the melt tension of a base resin or a foamed layer.

The results are plotted on a chart with the measured melt tension as ordinate and the time as abscissa to obtain a graph as shown in FIG. 3.

The melt tension of the specimen herein is the median value (X) of the amplitudes in the stable portion of the graph in FIG. 3. In the above procedures, when the resin string does not break up to the take-up speed of 500 rpm, then the melt tension of the string is determined from the above graph obtained at a take-up speed of 500 rpm. An abnormal amplitude might be appear in the graph on rare occasion. Such an abnormal amplitude should be ignored.

It is also preferred that the base resin for the formation of the foamed layer have a melt flow rate (MFR) of 0.1 to 10 g/10 min, more preferably 0.1 to 5 g/10 min, still more preferably 0.3 to 3 g/10 min, for reasons good extrusion moldability. The melt flow rate is as measured in accordance with JIS K7210-1976, Test Method A, at a temperature of 190° C. and a load of 21.2 N.

A base resin for forming the foamed layer of the present invention preferably has a melt tension of at least 3 cN and MFR of 0.1 to 10 g/10 min as described above. Such a polylactic acid resin may be suitably obtained by, for example, a method in which a raw material polylactic acid resin having a melt tension of less than 3 cN (excluding 0 cN) and MFR of 2 to 12 g/10 min is reacted with an organic peroxide to slightly crosslink the resin (the gel fraction is substantially 0) to obtain a modified polylactic acid resin, or a method in which the polylactic acid resin is reacted with an agent for increasing the molecular weight thereof, such as an isocyanate, an epoxy compound, a metal complex, a polyvalent carboxylic acid or a mixture thereof, to obtain a modified polylactic acid resin.

The organic peroxide used for obtaining a modified polylactic acid resin preferably has a 1 min half life temperature (the temperature at which the amount of the active oxygen of the organic peroxide decreases to half when the peroxide is heated at that temperature for 1 minute) which is higher than the melting point of the polylactic acid resin minus 10° C. When the 1 minute half life temperature is lower by 10° C. or more than the melting point, the organic peroxide will decompose and react before the organic peroxide is uniformly mixed with the polylactic acid resin during the heating and kneading and, therefore, the resin cannot be uniformly modified. Additionally, if an organic peroxide having a 1 minute half life temperature lower by 10° C. or more than the melting point is used, it is necessary to use the organic peroxide a greater amount than that required with the use of an organic peroxide having a 1 minute half life temperature higher than its melting point minus 10° C., in order to obtain a sufficient modifying effect. As a consequence, organic peroxide which remains undecomposed is present in a large amount in the succeeding extrusion foaming step. Therefore, crosslinking tends to proceeds excessively so that there is a possibility that gel fraction of the foamed resin increases and that a desired foamed body is not obtainable.

On the other hand, when the 1 minute half life temperature of an organic peroxide is considerably higher than the melting temperature of the resin, it is necessary to carry out the modification at a high temperature or for a long period of time. This may cause degradation of the molecular weight of the polylactic acid resin due to the thermal decomposition thereof. This may results in deterioration of the properties of the foamed body or failure to obtain satisfactory foamed body. For this reason, the 1 minute half life temperature of the organic peroxide is desirably not higher than the melting point of the polylactic acid resin plus 20° C.

As used herein, the term "melting point" of the polylactic acid resin is as determined by heat flux differential scanning calorimetry in accordance with JIS K7121-1987. More specifically, a test piece is heat treated under the condition specified in "3. Condition Adjustment (2)" (a cooling rate of 10° C./min is used). The condition-adjusted test piece is then subjected to the measurement at a heating rate 10° C./min to obtain an endothermic peak. The temperature of the apex of the endothermic peak represents the melting point. When two or more endothermic peaks are present, the temperature of the peak having the largest area represents the melting point.

The organic peroxide used for the modification of the polylactic acid resin may be any known oxide and may be, for example, isobutylperoxide [85° C.], cumyl peroxy neodecanoate [94° C.], α,α'-bis(neodecanoylperoxy)diisopropylbenzene [82° C.], di-n-propyl peroxydicarbonate [94° C.], diisopropyl peroxydicarbonate [88° C.], 1-cyclohexyl-1-methylethyl peroxy neodecanoate [94° C.], 1,1,3,3-tetramethylbutyl peroxy neodecanoate [92° C.], bis(4-t-butylcyclohexyl) peroxydicarbonate [92° C.], di-2-ethoxyethyl peroxydicarbonate [92° C.], di(2-ethylhexylperoxy)dicarbonate [9° C.], t-hexyl peroxy neodecanoate [10° C.], dimethoxybutyl peroxydicarbonate [102° C.], di(3-methyl-3-methoxybutylperoxy)dicarbonate [103° C.], t-butyl peroxy neodecanoate [104° C.], 2,4-dichlorobenzoyl peroxide [119° C.], t-hexyl peroxy pivalate [109° C.], t-butyl peroxy pivalate [110° C.], 3,5,5-trimethylhexanoyl peroxide [113° C.], octanoyl peroxide [117° C.], lauroyl peroxide [116° C.], stearoyl peroxide [117° C.], 1,1,3,3-tetramethylbutyl peroxy 2-ethylhexanoate [124° C.], succinic peroxide [132° C.], 2,5-dimethyl-2,5-di(2-ethylhexanoylperoxy)hexane [119° C.], 1-cyclohexyl-1-methylethyl peroxy 2-ethylhexanoate [138° C.], t-hexyl peroxy 2-ethylhexanoate [133° C.], t-butyl peroxy 2-ethylhexanoate [134° C.], m-toluoyl benzoyl peroxide [131° C.], benzoyl peroxide [130° C.], t-butyl peroxy isobutylate [136° C.], 1,1-bis(t-butylperoxy)-2-methylcyclohexane [142° C.], 1,1-bis(t-hexylperoxy)-3,3,5-trimethylcyclohexane [147° C.], 1,1-bis(t-butylperoxy)-3,3,5-trimethylcyclohexane [149° C.], 1,1-bis(t-hexylperoxy)cyclohexane [149° C.], 1,1-bis(t-butylperoxy)cyclohexane [154° C.], 2,2-bis(4,4-dibutylperoxycyclohexyl)propane [154° C.], 1,1-bis(t-butylperoxy)cyclododecane [153° C.], t-hexyl peroxy isopropyl monocarbonate [155° C.], t-butyl peroxy maleic acid [168° C.], t-butyl peroxy 3,3,5-trimethylhexanoate [166° C.], t-butyl peroxy laurate [159° C.], 2,5-dimethyl-2,5-di(m-toluoylperoxy)hexane [156° C.], t-butyl peroxy isopropyl monocarbonate [159° C.], t-butyl peroxy 2-ethylhexyl monocarbonate [161° C.], t-hexyl peroxy benzoate [160° C.], 2,5-dimethyl-2,5-di(benzoylperoxy)hexane [158° C.] and dicumyl peroxide [175° C.]. Above all, dicumyl peroxide is particularly preferably used. The temperatures given in the brackets immediately after the above organic peroxides are 1 min half life temperatures thereof. The organic peroxides may be used singly or in combination with two or more thereof. The organic peroxide or peroxides are generally used in an amount of 0.3 to 0.7 part by weight, preferably 0.4 to 0.6 part by weight, per 100 parts by weight of the base resin.

The 1 min half life temperature of the organic peroxide is measured as follows. A sample peroxide is dissolved in a suitable solvent inert to radicals, such as benzene or mineral spirit, to obtain a solution having a peroxide concentration of 0.1 mol/L. This is placed in a glass tube whose inside space has been substituted by nitrogen. The glass tube is sealed and immersed in a constant temperature bath maintained at a predetermined temperature to permit the peroxide to decompose.

The polylactic acid resin thus modified and a foamed layer made of such a modified resin has a gel fraction of substantially zero %. The term "gel fraction" as used herein is as measured by the following method. A sample of the modified polylactic acid resin or a foamed layer made of such a modified resin (precise weight W1; about 1 g) is immersed in 100 ml of chloroform contained in a 150 ml flask and the mixture is refluxed for 10 hours in boiling chloroform at about 61° C. The mixture is then immediately filtered through a 100 mesh wire net using a vacuum filtration device. The solids on the wire net are dried in an oven at 20° C. for 24 hours under a reduced pressure of 30-40 Torr. The weight (W2) of the dried matters is measured. A gel fraction is given as (W2/W1)× 100%. The term "gel fraction of substantially zero %" as used herein is intended to refer that the gel fraction is 2% or less (inclusive of 0). The gel fraction of the resin is preferably 0.5% by weight or less (inclusive of 0).

In the foamed layer constituting the multilayer foamed body of the present invention, the cell shape thereof should satisfy the formula (1) to (3) shown below. The cell shape herein is as measured for a middle layer of the foamed layer as described hereinafter.

$$0.05 < Z < 2.0 \quad (1)$$

$$0.2 < Z/X < 1.4 \quad (2)$$

$$0.2 < Z/Y < 1.7 \quad (3)$$

wherein X, Y and Z represent average cell diameters in the extrusion direction (MD direction), transverse direction (TD direction) and thickness direction, respectively, in the unit of mm.

When at least one of Z/X and Z/Y is 0.2 or less, the cell shape is so flat that the mechanical strength such as rigidity of the foamed layer is not satisfactory. Further, when the multilayer foamed body is used for thermoforming, the thermoformability, particularly deep thermoformability of the foamed layer becomes so poor that there is a possibility that the mechanical strength of a multi-layered polylactic acid resin foamed molded article (hereinafter referred to as multilayer foamed molded article) obtained by thermoforming is unsatisfactory. When Z/X and Z/Y are not smaller than 1.4 and 1.7, respectively, the dimensional stability is unsatisfactory. Further, when the multilayer foamed body is used for thermoforming, a draw down significantly occurs during heating and molding so that the thermoformability is no good. When Z is 0.05 mm or less, the mechanical strength and thermoformability are reduced. When Z is 2.0 or more, the appearance becomes no good. Further, there is a possibility that the flexibility is insufficient and that buckling is apt to be caused when subjected to an external force. A foamed layer having a cell shape which satisfies the above conditions, therefore, has excellent mechanical strength and thermoformability. A multilayer foamed body composed of such a foamed layer and a thermoplastic resin layer has more excellent mechanical strength and thermoformability. A multilayer foamed molded article obtained from such a multilayer foamed body has still more excellent in mechanical strength.

For reasons of obtaining a multilayer foamed body having further excellent mechanical strength, thermoformability and appearance, Z/X is preferably 0.2 to 0.8, still more preferably 0.3 to 0.7, Z/Y is preferably 0.2 to 0.6, still more preferably 0.25 to 0.60, and Z is preferably 0.05 to 0.8 mm, still more preferably 0.08 to 0.6 mm, particularly preferably 0.1 to 0.5 mm.

Figure 7A:
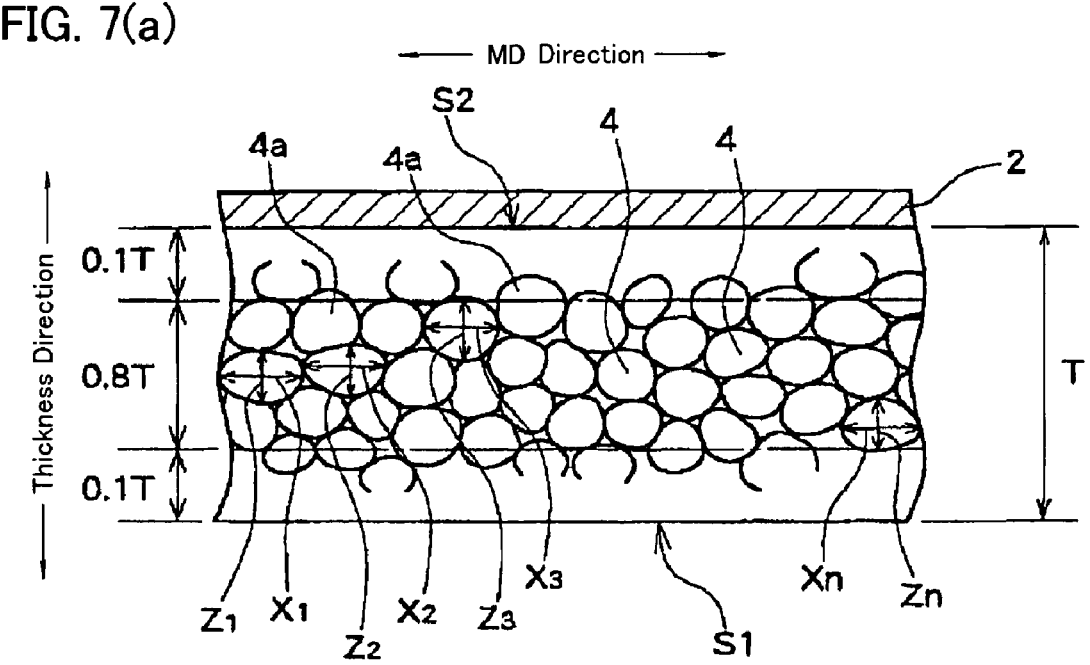
FIGS. 7($a$) and 7($b$) are vertical cross-sectional views of a multi-layered foamed body, explanatory of a method of measuring average cell diameters of its foamed layer.
Figure 7B:
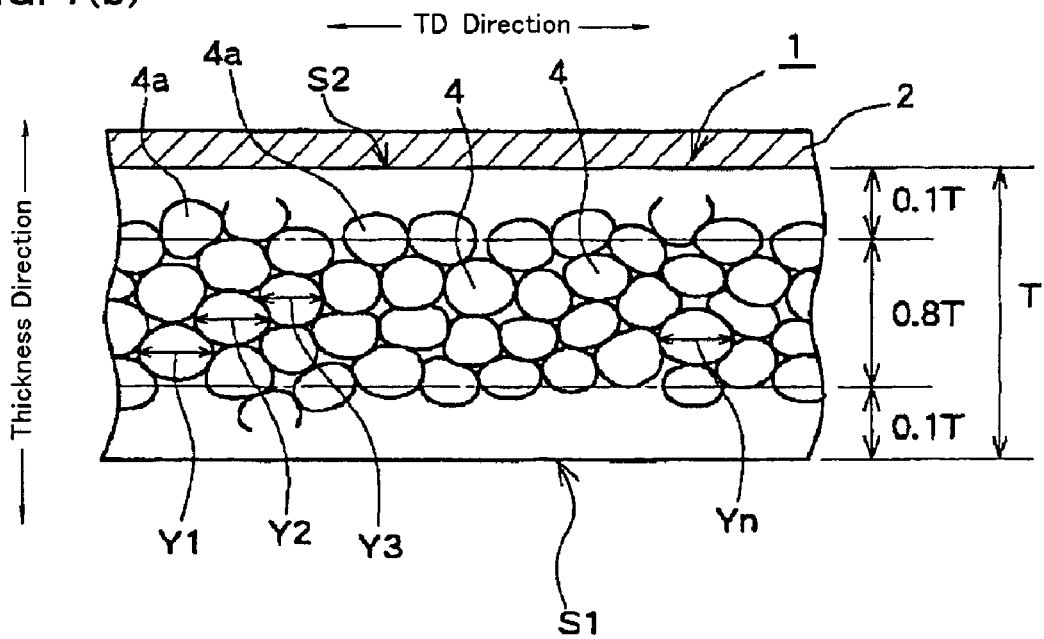

The cell shape expressed by the above formulas (1) to (3) is as measured in a middle layer of the foamed layer. The term "middle layer" as used herein is intended to refer to a layer which contains the center in the thickness direction and which does not include surface regions of up to a depth of 10% of the total thickness. Namely, as shown in FIG. 7(a) and FIG. 7(b), the middle layer is a middle portion, in the thickness direction, of the foamed layer having a thickness of 80% of the total thickness T of the foamed layer.

As used herein, the average cell diameters X, Y and Z are measured as follows. The average cell diameter (X mm) in the extrusion direction (MD direction), average cell diameter (Y mm) in the transverse direction (TD direction) and average cell diameter (Z mm) in the thickness direction of the middle layer of the foamed layer are determined on the basis of microphotographs obtained by photographing vertical cross-sections in the extrusion and transverse directions using a microscope.

More specifically, a microphotograph of a vertical cross-section in the MD direction of the foamed layer is obtained. On the obtained photograph, straight lines extending at positions spaced apart a distance 0.1 T (T is a total thickness of the foamed layer) from both surfaces of the foamed layer, namely the surface S1 of the foamed layer and from an interface S2 between the foamed layer and the resin layer, are drawn, so that the cells are divided into those of a middle layer and those of surface layers. As shown in FIG. 7(a), each of the all cells present in the middle layer on the photograph is measured, using a caliper, for the diameter x in the extrusion direction and the diameter z in the thickness direction. From the thus obtained values $(x_1, x_2, x_3, \ldots x_n)$ and $(z_1, z_2, z_3, \ldots z_n)$, arithmetic mean X and Z are calculated, from which Z/X is obtained. Of course, the values X and Z should be converted into true average cell diameter values in view of the magnification of the photograph.

To determine Y, a microphotograph of a vertical cross-section in the TD direction of the foamed layer is obtained. On the obtained photograph, straight lines extending at positions spaced apart a distance 0.1 T (T is a total thickness of the foamed layer) from both surfaces of the foamed layer are drawn, so that the cells are divided into those of a middle layer and those of surface layers. As shown in FIG. 7(b), each of the all cells present in the middle layer on the photograph is measured, using a caliper, for the diameter y in the transverse direction. From the thus obtained values $(y_1, y_2, y_3, \ldots y_n)$, arithmetic mean Y is calculated. From the value Y thus obtained and from the value Z obtained above, Z/Y is obtained. Of course, the value Y should be converted into true average cell diameter values in view of the magnification of the photograph. In the measurement of X, Y and Z, the cells 4a which are present on the lines extending at positions spaced apart a distance 0.1 T (T is a total thickness of the foamed layer) from both surfaces are not taken in consideration. The range of measurement of cell diameters using the microphotograph is carried out over the length of 3 times the thickness T of the foamed layer.

The above average cell diameter ratios and average cell diameters may be controlled as follows. The cell diameters X, Y and Z may be controlled by using an inorganic cell controlling agent such as talc or sodium hydrogen carbonate or an organic cell controlling agent in an amount of 0.1 to 3 parts by weight per 100 parts by weight of the base resin or by controlling the pressure in the die at the time of extrusion foaming. In particular, by increasing the amount of a cell controlling agent within such a range that permits the preparation of a foamed layer having good appearance and desired apparent density and thickness, the cell diameter can be made small. The cell shape can be also made small by increasing the pressure in the die. The cell diameter ratio Z/X can be controlled by controlling the hauling speed of the foamed layer immediately after the extrusion foaming. The cell diameter ratio Z/Y can be controlled by controlling the spreading ratio (blow-up ratio) in the transverse direction of the foamed layer immediately after the extrusion foaming.

The foamed layer preferably has a closed cell content of 50 to 100%, more preferably 70 to 100%, and most preferably 80 to 100%. When the closed cell content is within the above range, the mechanical strength and secondary foamability during the thermoforming are particularly excellent. Further, a multilayer foamed molded article obtained by thermoforming a multilayer foamed body having the foamed layer has high mechanical strength and good appearance including molding reproducibility.

As used herein, the closed cell content (%) of the foamed layer is obtained according to Procedure C of ASTM D-2856-70 (reapproved 1976) as follows. The true volume Vx of a specimen is measured using Air Comparison Pycnometer Type-930 manufactured by Toshiba Beckmann Inc, from which the closed cell content is calculated by the following formula (7):

Closed cell content (%)=$(Vx-W/p)\times 100/(Va-W/p)$ (7)

wherein Vx represents the true volume (cm$^3$) of the specimen measured by the above method, which corresponds to a sum of a volume of the resin constituting the specimen and a total volume of all the closed cells in the specimen.

In the formula (7), Va, W and p represent as follows:

Va: apparent volume (cm$^3$) of the specimen used for the measurement, which is calculated from the outer dimension thereof, W: total weight (g) of the specimen used for the measurement; and ρ: density (g/cm$^3$) of the base resin constituting the specimen.

Incidentally, since it is necessary to accommodate the specimen in a sample cup of the Air Comparison Pycnometer in a non-compressed state, the foamed layer is cut to have a length of 2.5 cm and a width of 2.5 cm (the cutout has a thickness equal to that of the foamed layer). A plurality of cutouts are stacked in such a number that the stack has an apparent volume of as near 15 cm$^3$ as possible to obtain the specimen.

The multilayer foamed body whose foamed layer has a controlled crystallinity has good secondary processability and is capable of giving a multilayer foamed body having high strength and high heat resistance. In particular, the multilayer foamed body for use in thermoforming can solve the conflicting problems of improvement of the thermoformability and improvement of heat resistance of a multi-layered polylactic acid resin foamed molded article during or after the thermoforming. Namely, the multilayer foamed body of the present invention is subjected to an adjustment of the crystallinity of its foamed layer by rapidly cooling surfaces of the foamed layer, obtained by extrusion foaming, with air or mist such that the difference ($\Delta H_{endo:2°\ C./min} - \Delta H_{exo:2°\ C./min}$) between an endothermic calorific value ($\Delta H_{endo:2°\ C./min}$) and an exothermic calorific value ($\Delta H_{exo:2°\ C./min}$) of the foamed layer as measured by heat flux differential scanning calorimetry at a heating rate of 2° C./min is less than 40 J/g and that the endothermic calorific value ($\Delta H_{endo:2°\ C./min}$) is at least 10 J/g and the exothermic calorific value ($\Delta H_{exo:2°\ C./min}$) is at least 3 J/g.

The exothermic calorific value $\Delta H_{exo:2°\ C./min}$ is the calorific value of a heat generated by the crystallization of a sample during the course of heating at a rate of 2° C./minute in the heat flux differential scanning calorimetry measurement. The greater is the exothermic calorific value $\Delta H_{exo:2°\ C./min}$, the lower is the degree of crystallization of the foamed layer. The endothermic calorific value $\Delta H_{endo:2°\ C./min}$ is the amount of heat of fusion absorbed by the sample as a result of the fusion of the crystals thereof during the course of heating at a rate of 2° C./minute in the heat flux differential scanning calorimetry measurement. The greater the endothermic calorific value $\Delta H_{endo:2°\ C./min}$, the higher become the rigidity and the heat resistance by increasing the degree of crystallization. The difference ($\Delta H_{endo:2°\ C./min} - \Delta H_{exo:2°\ C./min}$) represents a calorific value required for fusing the crystals originally contained in the sample at the time it is set in the heat flux differential scanning calorimeter. The smaller the difference is, the lower is the degree of crystallization of the foamed layer.

Thus, the fact that a foamed layer has ($\Delta H_{endo:2°\ C./min} - \Delta H_{exo:2°\ C./min}$) of less than 40 J/g indicates that the crystallization of the foamed layer has not yet significantly proceeded and is excellent in secondary processability such as thermoformability. The fact that ($\Delta H_{endo:2°\ C./min}$) is 10 J/g or more indicates that the crystallization of the foamed layer can proceed by heat treatment in a succeeding step so that the foamed layer has good rigidity and heat resistance.

In the present invention ($\Delta H_{endo:2°\ C./min} - \Delta H_{exo:2°\ C./min}$) is less than 40 J/g (inclusive of 0), preferably less than 30 J/g (inclusive of 0), more preferably not more than 20 J/g (inclusive of 0), still more preferably 1 to 20 J/g, particularly preferably 2 to 18 J/g. When ($\Delta H_{endo:2°\ C./min} - \Delta H_{exo:2°\ C./min}$) is excessively great, the secondary processability such as thermoformability of the foamed layer is not satisfactory. In particular, deep drawability, in thermoforming, of at least 1.5, particularly at least 2.0 in terms of expansion ratio (ratio (B)/(A) wherein (A) represents an area of the to be molded and (B) represents an area, after molding, corresponding to the area (A)) becomes no good.

The endothermic calorific value $\Delta H_{endo:2°\ C./min}$ of the foamed layer of the present invention is at least 10 J/g, preferably at least 20 J/g, more preferably at least 25 J/g, particularly preferably at least 30 J/g. When the endothermic calorific value $\Delta H_{endo:2°\ C./min}$ of the foamed layer is excessively small, satisfactory rigidity and heat resistance cannot be obtained even when the obtained multilayer foamed body is heat treated in a succeeding step. The upper limit of $\Delta H_{endo:2°\ C./min}$ is not specifically limited but is generally about 65 J/g.

The exothermic calorific value $\Delta H_{exo:2°\ C./min}$ of the foamed layer of the present invention is at least 3 J/g, preferably at least 5 J/g, more preferably at least 15 J/g, particularly preferably at least 20 J/g. When the exothermic calorific value $\Delta H_{exo:2°\ C./min}$ of the foamed layer is excessively small, crystallization of the obtained multilayer foamed body does not proceed even when it is subjected to heat treatment in a succeeding step. Therefore, the desired rigidity and heat resistance cannot be obtained. The upper limit of $\Delta H_{exo:2°\ C./min}$ is not specifically limited but is generally about 65 J/g. It is without saying that the exothermic calorific value $\Delta H_{exo:2°\ C./min}$ is not greater than the endothermic calorific value $\Delta H_{endo:2°\ C./min}$.

The "endothermic calorific value $\Delta H_{endo:2°\ C./min}$" and "exothermic calorific value $\Delta H_{exo:2°\ C./min}$" of the foamed layer are as determined by heat flux differential scanning calorimetry in accordance with JIS K7122-1987 except that a foam piece (1 to 4 mg) cut from the foamed layer is used as test sample and that the adjustment of the conditions of the test sample and the measurement of the calorific value from a DSC curve are carried out as follows.

The adjustment of the conditions of the test sample and the measurement of the calorific value from a DSC curve are carried out as follows. A sample is charged in a pan of a DSC device. Without performing any heat treatment, a DSC curve of the sample is measured while heating the sample at 2° C./minute to a temperature higher by about 30° C. than the temperature at which the endothermic peak ends. The exothermic calorific value $\Delta H_{exo:2° C./min}$ is a value obtained from the area defined by a line passing points "c" and "d" and the exothermic curve, wherein the point "c" is a point where an exothermic peak in the DSC curve begins separating from a low temperature-side base line, and the point "d" is a point where the exothermic peak returns to a high temperature-side base line. The endothermic calorific value $\Delta H_{endo:2° C./min}$ is a value obtained from the area defined by a line passing points "e" and "f" and the endothermic curve in the DSC curve, wherein the point "e" is a point where the endothermic peak of the DSC curve begins separating from a low temperature-side base line, and the point "f" is a point where the endothermic peak returns to a high temperature-side base line.

The DSC device is operated so that each of the base lines of the DSC curve is as straight as possible. When the base line or lines are inevitably curved, a point where exothermic peak starts separating from the curved low temperature-side base line represents the point "c", a point where exothermic peak returns to the curved high temperature-side base line represents the point "d", a point where endothermic peak starts separating from the curved low temperature-side base line represents the point "e", and a point where endothermic peak returns to the curved high temperature-side base line represents the point "f".

Figure 4:
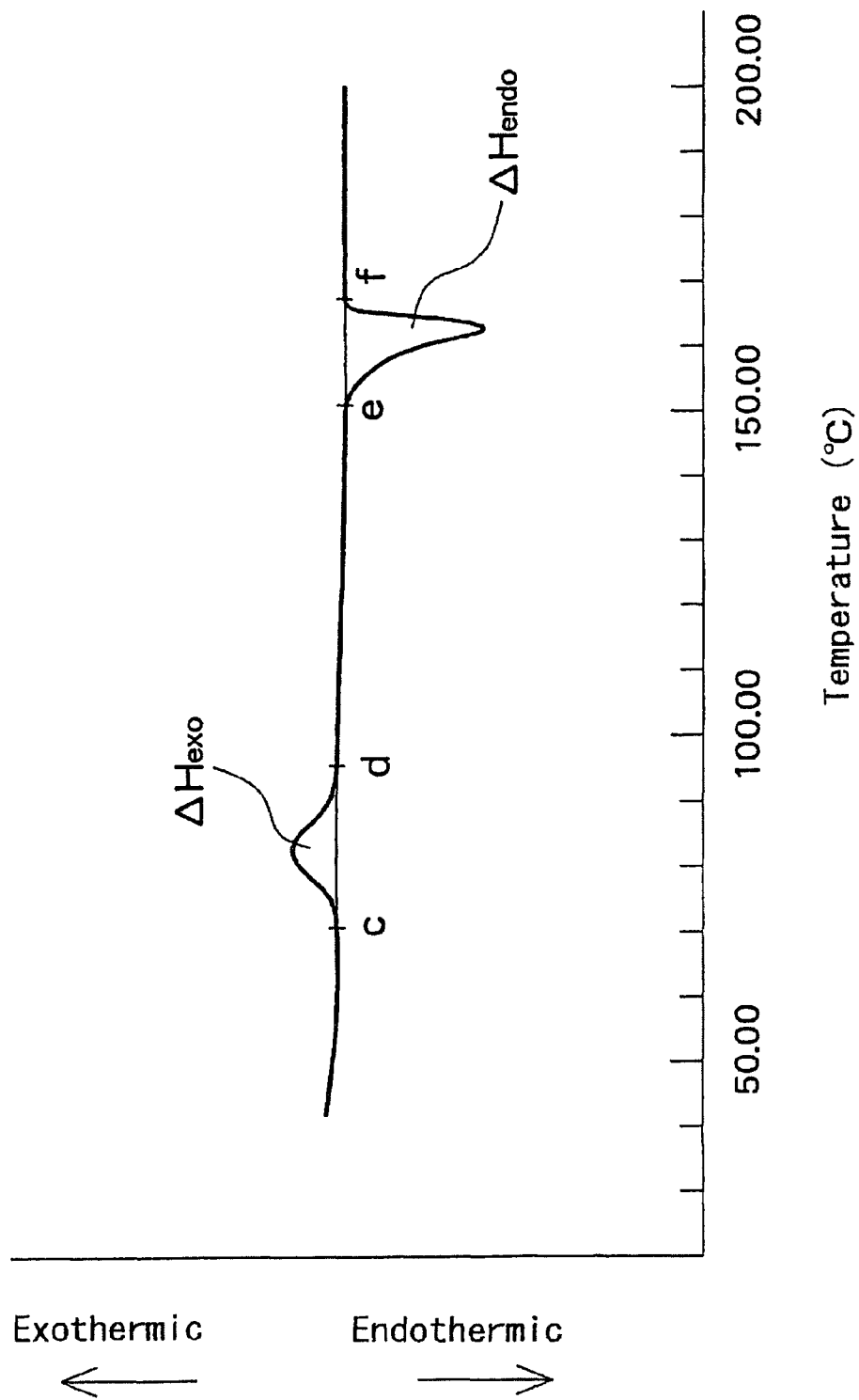
FIG. 4 is an explanatory view of a DSC curve showing $\Delta H_{exo:2° C./min}$ and $\Delta H_{endo:2° C./min}$ of a foamed layer as determined by a heat flux differential scanning calorimeter.
Figure 5:
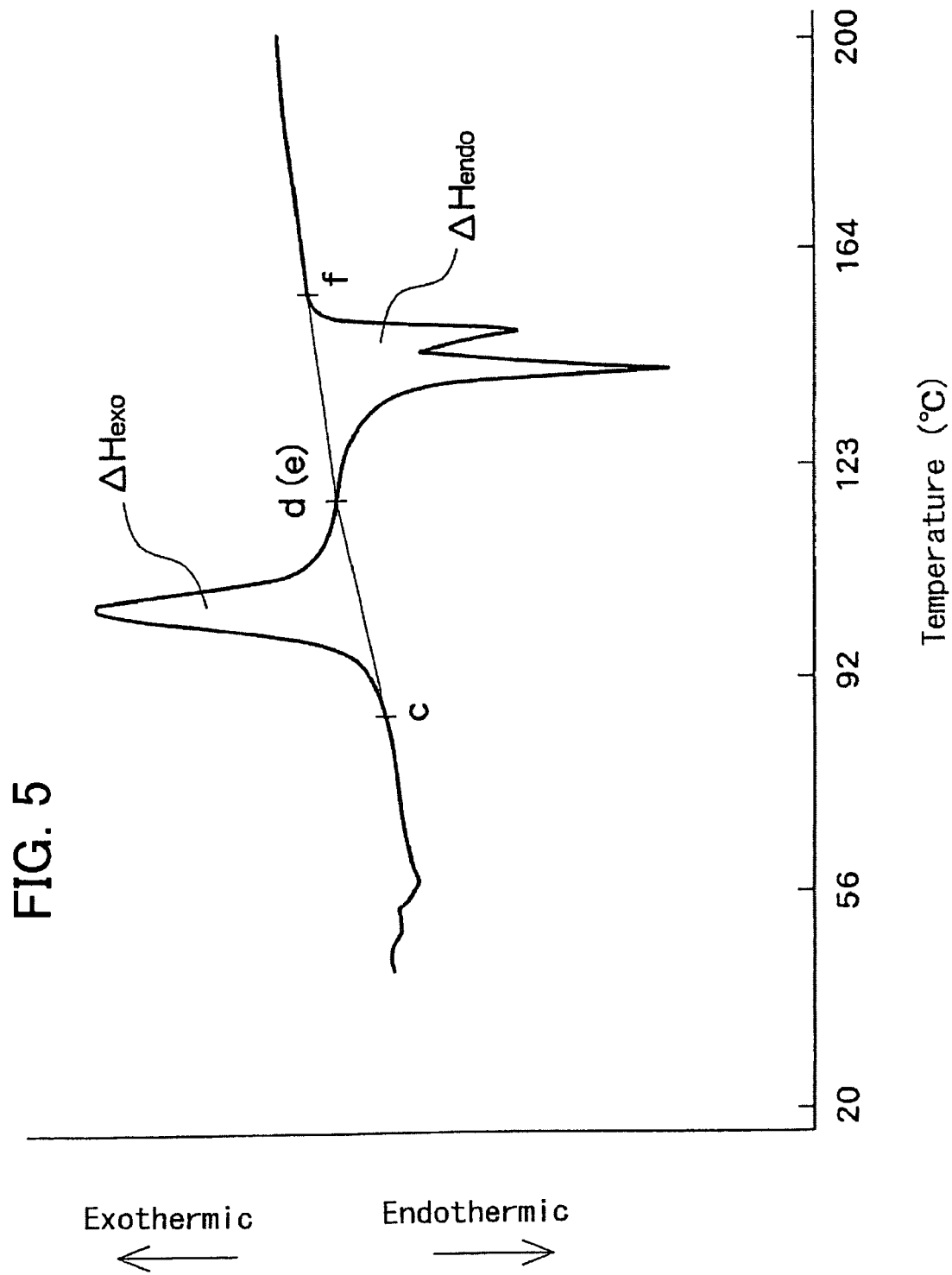
FIG. 5 is another explanatory view of a DSC curve showing $\Delta H_{exo:2° C./min}$ and $\Delta H_{endo:2° C./min}$ of a foamed layer as determined by a heat flux differential scanning calorimeter.

For example, when the DSC curve is as shown in FIG. 4, the exothermic calorific value $\Delta H_{exo:2° C./min}$ is determined from the area defined by a line passing points "c" and "d" specified above and the DSC curve, while the endothermic calorific value $\Delta H_{endo:2° C./min}$ is determined from the area defined by a line passing points "e" and "f" specified above and the DSC curve. When the DSC curve is as shown in FIG. 5, it is difficult to determine the points "d" and "e" by the above-specified method. In such a case, points "c" and "f" are first determined and, then, the intersection between a line passing the points "c" and "f" and the DSC curve is assigned as point "d(e)", from which the exothermic calorific value $\Delta H_{exo:2° C./min}$ and the endothermic calorific value $\Delta H_{exo:2° C./min}$ of the foamed layer are determined.

When, as shown in FIG. 6, there is a small exothermic peak on a low temperature-side of an endothermic peak, the exothermic calorific value $\Delta H_{exo:2° C./min}$ of the foam layer is determined as a sum of an area (A) of a first exothermic peak and an area (B) of a second exothermic peak as shown in FIG. 6. Namely, the area (A) is an area defined by a line passing through points "c" and "d" and the DSC curve, wherein the point "c" is a point where the first exothermic peak starts separating from the low temperature-side base line and the point "d" is a point where the first exothermic peak returns to the high temperature-side base line. The area (B) is an area defined by a line passing through points "g" and "e" and the DSC curve, wherein the point "g" is a point where the second exothermic peak starts separating from the low temperature-side base line and the point "e" is an intersection between the point "g" and a point "f" which is a point where the endothermic peak returns to the high temperature-side base line. In FIG. 6, the endothermic calorific value $\Delta H_{endo:2° C./min}$ is determined from an area defined by the line passing the points "e" and "f" and the DSC curve.

In the above-described measurement of the exothermic calorific value $\Delta H_{exo:2° C./min}$ and endothermic calorific value $\Delta H_{endo:2° C./min}$, a heating rate of 2° C./minute is used as a measuring condition for the DSC curve. The reason for this is that a heating rate of 2° C./minute is found by the present inventors to be suitable for separating the exothermic peak and endothermic peak as clear as possible and for obtaining precise exothermic calorific value $\Delta H_{exo:2° C./min}$ and endothermic calorific value $\Delta H_{endo:2° C./min}$ in the heat flux differential scanning calorimetry.

It is preferred that the foamed layer constituting the multilayer foamed body of the present invention have an exothermic calorific value $\Delta H_{exo:2° C./min}$, as measured by heat flux differential scanning calorimetry at a cooling rate of 10° C./min, of 20 to 45 J/g, more preferably 25 to 40 J/g, still more preferably 30 to 38 J/g. When the exothermic calorific value $\Delta H_{exo:2° C./min}$ is within the above range, the crystallization can proceed within a short time by a heat treatment of the obtained multilayer foamed body as a succeeding step. Thus, the multilayer foamed body having an excellent heat resistance may be obtained with a high efficiency. Further, there is no fear that the second processability and thermoformability, particularly deep drawability are reduced. by thermoforming the foamed sheet, followed by the heat treatment.

The fact that the $\Delta H_{exo:2° C./min}$ is in the range of 20 to 45 J/g indicates that the crystallization speed is not excessively fast or excessively slow, and that the foamed layer has optimum crystallization speed suitable for both the production of the foamed layer having a low degree of crystallization and the production of a multilayer foamed body having a high degree of crystallization by heat treatment as a succeeding step. The heat flux differential scanning calorimetry at a slow cooling rate of 2° C./min can show a clear exothermic peak even when adopted to measure a foamed layer composed of a polylactic acid resin of a slow crystallization speed, because crystallization of the resin proceeds during the DSC measurement. On the other hand, the heat flux differential scanning calorimetry at a high cooling rate of 100° C./min, crystallization of a foamed layer made of a polylactic acid resin of a slow crystallization speed hardly proceeds or does not at all proceed during the DSC measurement. Therefore, an exothermic peak is hardly or not at all observed. Thus, in the case of a foamed layer whose crystallization can proceed at a cooling rate of 10° C. during the heat flux differential scanning calorimetry thereof, the time required for heat treatment as a succeeding step for growing crystals is short so that the productivity of the multilayer foamed body having good heat resistance is improved. Accordingly, the foamed layer which shows $\Delta H_{exo:2° C./min}$ of 20 to 45 J/g in the heat flux differential scanning calorimetry at a cooling rate of 10° C. permits the crystallization to proceed fast in the heat treatment in a succeeding step and, therefore, is excellent in productivity of multilayer foamed body having excellent heat resistance.

The "exothermic calorific value $\Delta H_{exo:2° C./min}$" of the foamed layer is as determined by heat flux differential scanning calorimetry in accordance with JIS K7122-1987 except that a foam piece (1 to 4 mg) cut from the foamed layer is used as a test sample and that the adjustment of the conditions of the test sample and the measurement of the calorific value from a DSC curve are carried out as follows.

The adjustment of the conditions of the test sample and the measurement of the calorific value from a DSC curve are carried out as follows. A sample is charged in a pan of a DSC device and heated to 200° C. and fused. After the sample has been held at that temperature for 10 minutes, a DSC curve of the sample is measured while cooling the sample at 10° C./minute to 10° C.

The exothermic calorific value $\Delta H_{exo:2° C./min}$ is a value obtained from the area defined by a line passing points "h" and "i" and the DSC curve, wherein the point "h" is a point where an exothermic peak in the DSC curve begins separating from a high temperature-side base line, and the point "i" is a point where the exothermic peak returns to a low temperature-side base line (not illustrated in the drawings). The DSC device is operated so that each of the base lines is straight. When the base line or lines are inevitably curved, a point where the exothermic peak starts separating from the curved high temperature-side base line represents the point "h", while a point where the exothermic peak returns to the curved low temperature-side base line represents the point "i".

The foamed layer showing the exothermic calorific value $\Delta H_{exo:10° C./min}$ of at least 20 to 45 J/g in the heat flux differential scanning calorimetry may be obtained by, for example, extrusion foaming of a base resin of a polylactic acid resin modified by an organic peroxide. Further, by using, as a base resin, a mixture of such a modified polylactic acid resin with an inorganic substance such as talc in an amount of 0.1 to 10 parts by weight per 100 parts by weight of the modified polylactic acid resin, the crystallization speed may be further improved and a foamed layer having a higher exothermic calorific value $\Delta H_{exo:10° C./min}$ may be obtained.

Figure 8A:
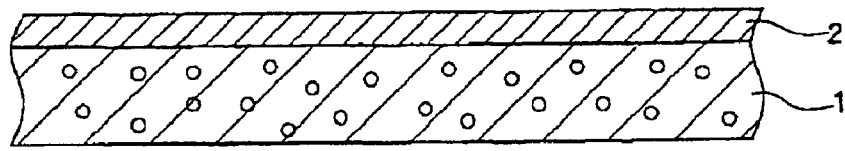
FIGS. 8($a$) to 8($e$) are vertical cross-sectional views of multi-layered foamed bodies.
Figure 8B:
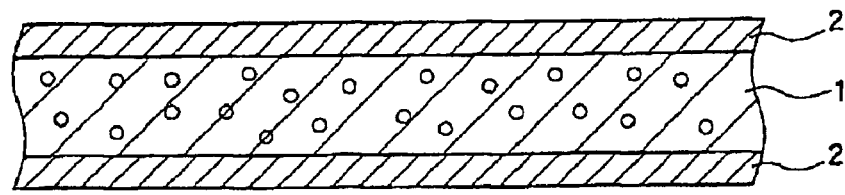
Figure 8C:
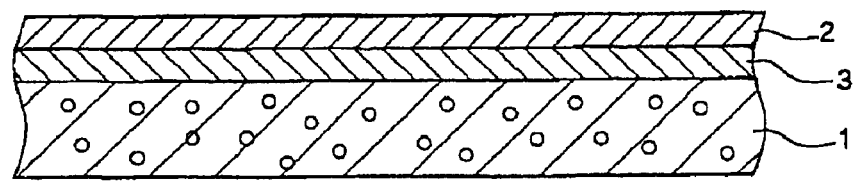
Figure 8D:
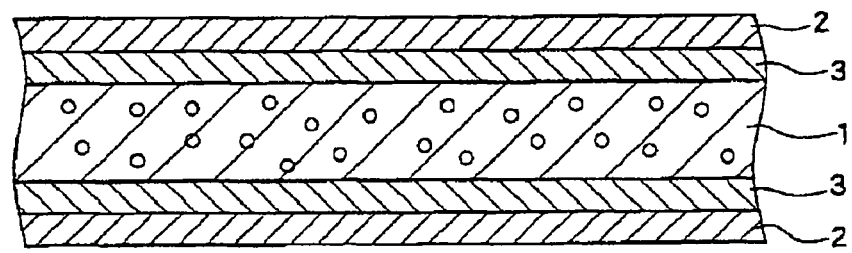

Described will be next made of the thermoplastic resin layer laminated and bonded to the foamed layer. The thermoplastic resin layer (hereinafter referred to simply as resin layer) may be provided only one side of the foamed layer (FIG. 8(a)) or on both sides of the foamed layer (FIG. 8(b)). The resin layer may be directly formed on the foamed layer (FIG. 8(a) and FIG. 8(b)) or may be provided via adhesive layer (FIG. 8(c) and FIG. 8(d)). In the latter case, the resin layer may be provided only one side of the foamed layer via the adhesive layer (FIG. 8(c)) or on both sides of the foamed layer via adhesive layers (FIG. 8(d)). Further, resin layers having different compositions may be provided on both sides of the foamed layer. In this case, one of the resin layers may be directly provided on the foamed layer with the other resin layer being provided on the formed layer via adhesive layer (FIG. 8(e)).

Figure 8E:
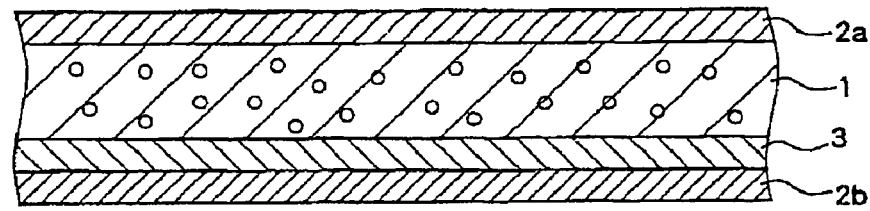

In FIG. 8(a) to 8(e), the reference numeral 1 denotes the foamed layer, 2 the resin layer and 3 the adhesive layer. In FIG. 8(e), designated as 2a and 2b are resin layers having different compositions.

The thickness of the resin layer is not specifically limited but is preferably 0.5 to 500 μm, more preferably 5 to 300 μm, still more preferably 15 to 180 μm. The "thickness of the resin layer" is intended to refer to a total thickness of the adhesive layer and the resin layer when the resin layer is laminated on the foamed layer via the adhesive layer, and to a total thickness of the resin layers when a plurality of resin layers are laminated on the foamed layer. When a plurality of resin layers are laminated via adhesive layers, the "thickness of the resin layer" is intended to refer to a total thickness of the plural resin layers and the adhesive layers.

As the resin constituting the thermoplastic resin layer in the present invention, there may be mentioned a polyolefin resin, a polyester resin, a polystyrene resin, a polyamide resin such as Nylon-6 or Nylon-6,6, a polyacrylic resin such as polymethyl methacrylate or polyacrylate, a polycarbonate resin and mixtures of these resins.

Examples of the polyolefin resin include polyethylene resins such as low density polyethylene, high density polyethylene, linear low density polyethylene, ethylene-propylene copolymers, ethylene-butene copolymers, ethylene-vinyl acetate copolymers, ethylene-methyl methacrylate copolymers and ethylene ionomers obtained by inter-molecular cross-linking of an ethylene-methacrylic acid copolymer with metal ions; and polypropylene resins such as propylene homopolymers, propylene-ethylene copolymers, propylene-butene copolymers, propylene-ethylene-butene terpolymers, propylene-acrylic acid copolymers and propylene-maleic anhydride copolymers. Graft-modified polyolefin resins, obtained by impregnating the above polyolefin resins with a vinyl monomer such as styrene and graft polymerizing the monomer onto the resins, may be also used.

As the polystyrene resin, there may be mentioned polystyrene, high impact polystyrene (HIPS) and styrene-based elastomers.

As the polyester resin, there may be mentioned aliphatic polyester, aliphatic aromatic polyester and aromatic polyester. Examples of the aliphatic polyester include biodegradable aliphatic polyesters, such as polybutyrene succinate, polybutyrene adipate and polybutyrene succinate adipate, obtainable by, for example, polycondensation of a dicarboxylic acid component and a diol component; and above-described polylactic acid resins which are used for the foamed layer.

Examples of the aromatic polyester include polyesters obtained by polycondensation of a dicarboxylic acid component and a diol component or by interesterification of polyester polymers and/or polyester copolymers. Specific examples of the aromatic polyester include polyethylene terephthalate, polyethylene phthalate, and polybutyrene terephthalate.

Examples of the aliphatic aromatic polyester include polyesters obtained by polycondensation of a dicarboxylic acid component and a diol component or by interesterification of polyester polymers and/or polyester copolymers. Specific examples of the aliphatic aromatic polyester include polybutyrene succinate terephthalate, polybutyrene adipate terephthalate and polybutyrene succinate adipate terephthalate.

A method for laminating a thermoplastic resin layer on a foamed layer is not specifically limited. A suitable method such as bonding with an adhesive, fusion bonding, coextrusion or extrusion lamination of a molten resin may be adopted. The resin layer of the present invention is not limited to a single layer. The resin layer may be composed of a plurality of layers of the above thermoplastic resins.

A thermoplastic resin film may be used as the above-described resin layer laminated on the foamed layer. Such a film may be a stretched or non-stretched film. Preferably used as the thermoplastic resin film is a composite film which comprises a substrate layer and a heat seal layer forming at least one of the outermost layers of the composite film. The substrate layer is a biaxially stretched film of a polylactic acid resin, while the heat seal layer is a film formed of a polylactic acid resin and an aliphatic aromatic polyester and having a ratio by mass of the polylactic acid resin to the aliphatic aromatic polyester of 90/10 to 0/100.

As an adhesive layer for use in laminating the foamed layer and the resin layer, a mixture of a polylactic acid resin and a thermoplastic resin is preferably used. The thermoplastic resin may be the same as that constituting the resin layer. The adhesive layer may also be a carboxylic acid-modified polyolefin polymer or a mixture of the carboxylic acid-modified polyolefin polymer with the above-mentioned thermoplastic resin and/or polylactic acid resin. The carboxylic acid-modified polyolefin polymer is obtained by copolymerizing one or more monomers selected from acid anhydrides such as acetic anhydride, maleic anhydride and phthalic anhydride, methacrylic acid, maleic acid and acrylic acid, etc. with a polyolefin polymer such as polyethylene polymer, polypropylene polymer or ethylene-vinyl acetate copolymer.

It is preferred that the above mixture contains an additive which can act as a compatiblizing component or an elastic component. The additive serving as a compatiblizing component or an elastic component may be a styrene-butadiene-styrene block copolymer, a styrene-isoprene-styrene block copolymer or a thermoplastic elastomer such as hydrogenation products of the block copolymers.

The foamed layer of the multilayer foamed body of the present invention may be heat treated to permit the crystallization thereof to proceed and to increase the heat resistance thereof. The heat treatment may be performed at a temperature higher than the glass transition temperature of the polylactic acid resin constituting the foamed layer, preferably not lower than (the glass transition temperature plus 5° C.) but not higher than (the glass transition temperature plus 70° C.), more preferably not lower than (the glass transition temperature plus 7° C.) but not higher than (the glass transition temperature plus 50° C.), particularly preferably not lower than (the glass transition temperature plus 10° C.) but not higher than (the glass transition temperature plus 30° C.). In the case of the multilayer foamed body showing $\Delta H_{exo:10° C./min}$ of 20 to 45 J/g in the heat flux differential scanning calorimetry at a cooling rate of 10° C., since the crystallization can proceed fast, excellent heat resistance can be imparted thereto by the heat treatment within a short period of time. The upper limit of the temperature of the heat treatment is of course below the melting point of the polylactic acid resin constituting the foamed layer. Even when the heat treatment temperature is below the melting point, high crystallization speed of the polylactic acid resin is not obtainable if the heat treatment temperature is near the melting point. For this reason and for reason of shape retentivity of the foamed body, the above-specified heat treatment temperature is preferred. The treatment time at the above treatment temperature may be suitably adjusted in view of the degree of crystallization and heat resistance of the desired multilayer foamed body.

The "glass transition point" as used herein is calculated as the midpoint glass transition temperature in a DSC curve obtained by heat flux differential scanning calorimetry measured in accordance with JIS K7121-1987. The "glass transition point is measured after the sample has been heat treated under specified conditions" as described in JIS K7121-1987, Paragraph 3, Control of conditions of sample (3). Namely, a sample is placed in a pan of a DSC device and heated to 200° C. at a heating rate of 10° C./minute and maintained at 200° C. for 10 minutes. The melted sample is then cooled from 200° C. to 50° C. at a cooling rate of 40° C./minute and then from 50° C. to 0° C. at a cooling rate of 30° C./minute. The resulting sample is then subjected to the DSC measurement. In the above measurement of the glass transition point, the specific cooling conditions from 200° C. to 0° C. are adopted for the purpose of stabilizing the base line of the DSC curve.

When the multilayer foamed body is thermoformed into a multilayer foamed molded article, the heat treatment thereof may be conducted by a method in which the foamed body is maintained at the above-described treatment temperature in a mold at the time the foamed body is molded therein, a method in which, after the molding is over, the foamed molded article is transferred to another mold and held at the above-described treatment temperature, or a method in which the foamed molded article is held in an aging chamber or aging device whose temperature is adjusted at the above-described treatment temperature. When the multilayer foamed body is in the form of a plate, the heat treatment thereof may be conducted by a method in which the foamed body placed between heating plates is maintained at the above-described treatment temperature, or a method in which the foamed molded article is held in an aging chamber or aging device whose temperature is adjusted at the above-described treatment temperature.

In the highly heat resistant, multi-layered polylactic acid resin foamed body obtained by the heat treatment for proceeding the crystallization, since the difference $(\Delta H_{endo:2° C./min} - \Delta H_{exo:2° C./min})$ between an endothermic calorific value $(\Delta H_{endo:2° C./min})$ and an exothermic calorific value $(\Delta H_{exo:2° C./min})$ of the foamed layer as measured by heat flux differential scanning calorimetry at a heating rate of 2° C./min is, as described previously, at least 10 J/g, preferably at least 15 J/g, more preferably at least 20 J/g, still more preferably at least 25 J/g, most preferably at least 30 J/g, and is greater than $(\Delta H_{endo:2° C./min} - \Delta H_{exo:2° C./min})$ of the multi-layered polylactic acid resin foamed body before the heat treatment by at least 3 J/g, preferably at least 5 J/g, more preferably at least 10 J/g, still more preferably at least 15 J/g, most preferably at least 20 J/g, the crystallization of such a foamed body has proceeded sufficiently and the rigidity and heat resistance are particularly excellent. The fact that $(\Delta H_{endo:2° C./min} - \Delta H_{exo:2° C./min})$ of the foamed body after the heat treatment is excessively small means that the degree of crystallization is insufficient. The fact that $(\Delta H_{endo:2° C./min} - \Delta H_{exo:2° C./min})$ of the foamed body after the heat treatment is not higher than that before the heat treatment means that the crystallization has not yet been proceeded sufficiently. Thus, when the above two conditions are met, the desired rigidity and heat resistance are obtained.

The $(\Delta H_{endo:2° C./min} - \Delta H_{exo:2° C./min})$ value of the foamed layer of the multilayer foamed body, whose heat resistance has been improved by the heat treatment, represents a calorific value required for fusing the crystals contained in the foamed body after the heat treatment in the heat flux differential scanning calorimetry. The smaller the value is, the lower the degree of crystallization of the foamed layer and, hence, the heat resistance is low. The upper limit of the $(\Delta H_{endo:2° C./min} - \Delta H_{exo:2° C./min})$ value is not specifically limited but is generally 65 J/g. The $\Delta H_{exo:2° C./min}$ value may be occasionally 0.

The exothermic calorific value $\Delta H_{exo:2° C./min}$ and endothermic calorific value $\Delta H_{endo:2° C./min}$ of the multilayer foamed body whose heat resistance has been improved by the heat treatment may be measured in the same manner as that for the above-described measurement of endothermic calorific value $\Delta H_{endo:2° C./min}$ and exothermic calorific value $\Delta H_{exo:2° C./min}$ of the multilayer foamed body before the heat treatment except that a sample (1 to 4 mg) of the foamed layer is cut out from the multilayer foamed body after the heat treatment.

The multilayer foamed body of the present invention is preferably used for thermoforming. Description will be next made of the multi-layered polylactic acid resin foamed molded article obtained by thermoforming the multilayer foamed body of the present invention.

A multi-layered polylactic acid resin foamed molded article of the present invention is obtained by thermoforming a laminate comprising a polylactic acid resin foamed layer and a thermoplastic resin layer provided at least one side of the foamed layer, wherein a difference $(\Delta H_{endo:2° C./min} - \Delta H_{exo:2° C./min})$ between an endothermic calorific value $(\Delta H_{endo:2° C./min})$ and an exothermic calorific value $(\Delta H_{exo:2° C./min})$ of the foamed layer as measured by heat flux differential scanning calorimetry at a heating rate of 2° C./min is at least 10 J/g, preferably at least 15 J/g, more preferably at least 20 J/g, still more preferably at least 25 J/g, most preferably at least 30 J/g. The crystallization of the foamed layer has sufficiently proceeded so that the foamed molded article has excellent rigidity and heat resistance. The upper limit of $(\Delta H_{endo:2° C./min} - \Delta H_{exo:2° C./min})$ is not specifically limited but is generally 65 J/g. The $\Delta H_{exo:2° C./min}$ value may be occasionally 0.

The exothermic calorific value $\Delta H_{exo:2° C./min}$ and endothermic calorific value $\Delta H_{endo:2° C./min}$ of the highly heat resistant, multilayer foamed molded article may be measured in the same manner as that for the above-described measurement of endothermic calorific value $\Delta H_{endo:2° C./min}$ and exothermic calorific value $\Delta H_{exo:2° C./min}$ of the multilayer foamed body before the heat treatment except that a sample (1 to 4 mg) of the foamed layer is cut out from the multilayer foamed molded article.

The multilayer foamed molded article may be obtained by thermoforming the multilayer foamed body, followed by a heat treatment, as described below.

The multilayer foamed body is heated and softened and is thermoformed by any suitable method, such as by vacuum molding and/or air pressure forming, and modified molding method thereof such as matched molding or plug assist molding. Thus, the multilayer foamed body is molded mainly into trays, cups, bowls and lunch boxes. When the multilayer foamed body having a resin layer on only one side thereof is molded into a receptacle such as a cup or a bowl, it is generally molded such that the resin layer is the exterior surface thereof. When molded into a receptacle such as a tray, on the other hand, the multilayer foamed body is generally molded such that the resin layer is the interior surface thereof. However, in the multilayer foamed molded article of the present invention, the resin layer may be formed on its exterior or interior surface or may be formed on each of the both surfaces thereof.

The multilayer foamed molded article of the present invention may be obtained by, for example, thermoforming a thermally untreated multilayer foamed body and, then, maintaining the resulting molding under the above-described heat treating conditions in the same mold used for the thermoforming or in another mold. In the heat treatment in the mold, the mold is preferably held at a temperature of 80 to 130° C., more preferably 90 to 120° C., for 10 to 90 seconds, more preferably 10 to 60 seconds. When the heat treatment temperature for proceeding the crystallization is excessively low, a long time is required for the crystallization, resulting in a reduction of the productivity. When the heat treatment temperature is excessively high, it is difficult to sufficiently proceed the crystallization. Further, there is a possibility that the strength of the multilayer foamed molded article after release from the mold tends to reduce.

In addition to the above method, the multilayer foamed molded article of the present invention may be obtained by thermoforming a thermally untreated multilayer foamed body and, then, aging the resulting molding in the atmosphere at a temperature of 60 to 80° C., which is not lower than the glass transition point of the polylactic acid resin, preferably for at least 0.5 hour, more preferably at least 1 hour. The upper limit of the aging time is not specifically limited but is generally 36 hours or less from the standpoint of productivity.

In the present invention, because the degree of crystallization of the foamed layer of the multilayer foamed body is rendered at a low level, the foamed body exhibits good moldability such as deep drawability when heated to a temperature near the glass transition point of the polylactic acid resin at the time of thermoforming. Thus, the obtained multilayer foamed molded article has good appearance. Additionally, since a heat treatment is performed simultaneously with or after the thermoforming of the multilayer foamed body at a temperature not lower than the glass transition point of the polylactic acid resin, the crystallization of the foamed layer of the multilayer foamed molded article has proceeded so that the foamed layer shows excellent heat resistance. In particular, when the multilayer foamed body of the present invention has an exothermic calorific value ($\Delta H_{exo:10° C./min}$), as measured by heat flux differential scanning calorimetry at a cooling rate of 10° C./min, of 20 to 45 J/g, sufficiently high heat resistance can be imparted to the multilayer foamed molded article even by a short time heat treatment for proceeding the crystallization after the thermoforming in the same mold as used in the thermoforming or in a different mold.

The thus obtained plate-like multilayer foamed body having high heat resistance according to the present invention may be suitably used as display boards, core materials, protective materials, box assembling materials, etc. The multilayer foamed body having high heat resistance of the present invention, especially the multilayer foamed molded article, may be suitably used as food receptacles (e.g. lunch trays, noodle bowls, fruit and vegetable containers, etc.) and cushion packages and receptacles for precision instruments, electrical appliances, etc.

EXAMPLES

The present invention will described below by way of examples and comparative examples.

Polylactic acid resins A to D used in Examples and Comparative Examples are as follows. Resins A to D were prepared as follows.

Polylactic acid resins A and B were prepared using a two-axis extruder having an inside diameter of 47 mm as follows. 100 Parts by weight of crystalline polylactic acid resin (H-100, manufactured by Mitsui Chemical Corporation, density: 1,260 kg/m$^3$, endothermic calorific value $\Delta H_{endo:raw}$: 49 J/g) and a peroxide (DCP: dicumyl peroxide) in an amount shown in Table 1 were fed to the two-axis extruder. The mixture was heated to a temperature higher than a temperature at which the resin melted and fused and kneaded. The melt was adjusted to a temperature of 215° C. and extruded in the form of strands. The strands were immersed into water at about 25° C. for cooling and cut into pellets, thereby obtaining polylactic acid resins A and B. The physical properties of polylactic acid resins A and B are shown in Table 1.

TABLE 1

| Polylactic acid resin | | Resin A | Resin B |
|---|---|---|---|
| Peroxide | Kind | DCP | DCP |
| | Parts by weight* | 0.6 | 0.4 |
| Melt tension (cN) | | 27 | 16 |
| Glass transition point (° C.) | | 59.6 | 59.6 |

*parts by weight per 100 parts by weight of polylactic acid resin

Crystalline polylactic acid resin H-100 was used as polylactic acid resin C and non-crystalline polylactic acid H280 manufactured by Mitsui Chemical Corporation was used as polylactic acid resin D. The physical properties of polylactic acid resins C and D are shown in Table 2.

TABLE 2

| Polylactic acid resin | Resin C | Resin D |
|---|---|---|
| Trade Name of Mitsui Chemical Corporation | H-100 | H280 |
| Melt tension (cN) | 0.4 | 1.6 |
| Glass transition point (° C.) | 59.6 | 54.1 |

Example 1

Two, first and second extruders having inside diameters of 90 mm and 120 mm were connected in tandem and used for the preparation of a foamed layer. Thus, polylactic acid resin A and a cell controlling agent (kind and amount are shown in Table 3) were fed to the first extruder and heated, fused and kneaded, to which a blowing agent (kind and amount are shown in Table 3) was then fed under a pressure and kneaded to obtain a molten kneaded mass. The kneaded mass was then fed to the second extruder connected to the first extruder and cooled therein to 171° C. and extruded through a circular die having a diameter of 135 mm and a lip clearance of 0.5 mm and to allowed to foam at a blow-up ratio of 2.5 in a tubular form. The tubular foamed product was hauled at a rate of 5.0 m/min, while being cooled, and cut in the extrusion direction and opened to obtain a foamed layer (foamed sheet).

The concrete conditions for cooling the tubular foamed product were as follows. Thus, the tubular foamed product was cooled by blowing air on the inside surface of the tubular foamed product immediately after extrusion at a rate of 0.4 m$^3$/min (23° C., 1 atm) while blowing air around the outside thereof at a rate of 0.9 m$^3$/min (23° C., 1 atm) and by sliding the tubular foamed product over a mandrel of a cooling device adjusted to 5° C. and having a diameter of 333 mm, thereby obtaining the foamed layer (foamed sheet).

The foamed layer was aged at room temperature and ambient pressure for 40 days and then laminated, using a heated roll at 127° C., on a biaxially stretched film (total thickness: 30 μm, thickness of adhesive layer: 15 μm) composed of a substrate layer, as a resin layer, of crystalline polylactic acid (H-100, manufactured by Mitsui Chemical Corporation) and an adhesive layer of aliphatic aromatic copolymer polyester (ECOFLEX manufactured by BASF) such that the adhesive layer was in contact with the foamed layer. The thus obtained multilayer foamed body had physical properties shown in Table 3.

Using a vacuum forming machine (Model FKS, manufactured by Asano Laboratories Co., Ltd.) for testing, four side edges of the multilayer foamed bodies were clamped and both surfaces thereof were heated with a heater. Then the foamed body was shaped in a mold into a bowl in the shape of an inverted circular truncated cone having a top opening diameter of 130 mm, a bottom diameter of 100 mm and a depth of 70 mm (draw ratio: 2.54). Thereafter, the bowl was heat treated for 30 seconds in a mold maintained at 110° C. Results of the evaluation of the moldability and evaluation of the multilayer foamed molded article are shown in Table 3.

Example 2

A molten kneaded mass for foaming was obtained in the same manner as that in Example 1 except that polylactic acid resin B was substituted for polylactic acid resin A, that the resin temperature was adjusted at 169° C., and that the cell controlling agent was used in an amount shown in Table 3. At the same time, Resin C was fed to another extruder, heated, melted and kneaded to obtain a melt for forming a resin layer. The thus obtained molten kneaded mass for foaming and melt for forming a resin layer were fed to a circular die for coextrusion having a diameter of 135 mm and a lip clearance of 0.5 mm and coextruded through the circular die at a blow-up ratio of 2.5 such that the melt for forming a resin layer flowed outside a flow of the molten kneaded mass for foaming, thereby to allow the molten kneaded mass to foam in a tubular shape. The tubular multilayer foamed product was hauled at a rate of 4.2 m/min, while being cooled, and cut in the extrusion direction and opened to obtain a multilayer foamed body having a resin layer on one side thereof. The physical properties of the multilayer foamed body are shown in Table 3.

The concrete conditions for cooling the multilayer tubular foamed product were as follows. Thus, the multilayer tubular foamed product was cooled by blowing air on the inside surface of the tubular foamed product immediately after extrusion at a rate of 0.4 m$^3$/min (23° C., 1 atm) while blowing air around the outside thereof at a rate of 1.0 m$^3$/min (23° C., 1 atm) and by sliding the multilayer tubular foamed product over a mandrel of a cooling device adjusted to 5° C. and having a diameter of 333 mm, thereby obtaining the multilayer foamed body (foamed sheet). The physical properties of the multilayer foamed body are shown in Table 3.

The thus obtained multilayer foamed body was thermoformed in the same manner as that in Example 1 to obtain a multilayer foamed molded article. Results of the evaluation of the moldability and evaluation of the multilayer foamed molded article are shown in Table 3.

Example 3

A molten kneaded mass for foaming was obtained in the same manner as that in Example 2 except that the cell controlling agent was used in an amount shown in Table 3. At the same time, a melt for forming a resin layer was obtained in the same manner as that in Example 2. The thus obtained molten kneaded mass for foaming and melt for forming a resin layer were fed to a circular die for coextrusion having a diameter of 135 mm and a lip clearance of 0.5 mm and coextruded through the circular die at a blow-up ratio of 2.5 such that the melt for forming a resin layer flowed outside and inside a flow of the molten kneaded mass for foaming, thereby to allow the molten kneaded mass to foam in a tubular shape. In the same manner as that in Example 2, the tubular multilayer foamed product was hauled at a rate of 4.2 m/min, while being cooled, and cut in the extrusion direction and opened to obtain a multilayer foamed body having a resin layer on both sides thereof. The physical properties of the multilayer foamed body are shown in Table 3.

The thus obtained multilayer foamed body was thermoformed in the same manner as that in Example 1 to obtain a multilayer foamed molded article. Results of the evaluation of the moldability and evaluation of the multilayer foamed molded article are shown in Table 3.

Example 4

Two, first and second extruders having inside diameters of 90 mm and 120 mm were connected in tandem and used for the preparation of a foamed layer. Thus, polylactic acid resin B and a cell controlling agent (kind and amount are shown in Table 3) were fed to the first extruder and heated, fused and kneaded, to which a blowing agent (kind and amount are shown in Table 3) was then fed under a pressure and kneaded to obtain a molten kneaded mass. The kneaded mass was then fed to the second extruder connected to the first extruder and cooled therein to 169° C. and extruded through a circular die having a diameter of 135 mm and a lip clearance of 0.5 mm and to allowed to foam at a blow-up ratio of 2.5 in a tubular form. The tubular foamed product was hauled at a rate of 4.0 m/min, while being cooled, and cut in the extrusion direction and opened to obtain a foamed layer (foamed sheet).

The concrete conditions for cooling the tubular foamed product were as follows. Thus, the tubular foamed product was cooled by blowing air on the inside surface of the tubular foamed product immediately after extrusion at a rate of 0.4 m$^3$/min (23° C., 1 atm) while blowing air around the outside thereof at a rate of 0.85 m$^3$/min (23° C., 1 atm) and by sliding the tubular foamed product over a mandrel of a cooling device adjusted to 5° C. and having a diameter of 333 mm, thereby obtaining the foamed layer (foamed sheet).

The foamed layer was aged at room temperature and ambient pressure for 40 days. Resin C was fed to an extruder and heated, melted and kneaded to obtain a melt. The melt was adjusted at 190° C. and extruded through a T-die onto one side of the aged foam layer (foamed sheet) to form a resin layer laminated on the foam layer, thereby obtaining a multilayer foamed body. The physical properties of the multilayer foamed body are shown in Table 3.

The thus obtained multilayer foamed body was thermoformed in the same manner as that in Example 1 to obtain a multilayer foamed molded article. Results of the evaluation of the moldability and evaluation of the multilayer foamed molded article are shown in Table 3.

Example 5

Two, first and second extruders having inside diameters of 90 mm and 120 mm were connected in tandem and used for the preparation of a foamed layer. Thus, polylactic acid resin B and a cell controlling agent (kind and amount are shown in Table 3) were fed to the first extruder and heated, fused and kneaded, to which a blowing agent (kind and amount are shown in Table 3) was then fed under a pressure and kneaded to obtain a molten kneaded mass. The kneaded mass was then fed to the second extruder connected to the first extruder and cooled therein to 169° C. to obtain a molten kneaded mass for foaming. At the same time, polypropylene homopolymer (J900GP: Idemitsu Petrochemical Co., Ltd.) and Resin C were fed at weight feed ratio of 50:50 to another extruder, heated, melted and kneaded to obtain a melt for forming an adhesive layer. Further, polypropylene homopolymer (J900GP: Idemitsu Petrochemical Co., Ltd.) was fed to a further extruder, heated, melted and kneaded to obtain a melt for forming a resin layer.

The thus obtained molten kneaded mass for foaming, a melt for forming an adhesive layer and a melt for forming a resin layer were fed to a circular die for coextrusion having a diameter of 110 mm and a lip clearance of 0.5 mm and coextruded through the circular die at a blow-up ratio of 3.3 such that flows of the molten kneaded mass for foaming, the melt for forming an adhesive layer and the melt for forming a resin layer were arranged in this order from inside toward outside thereby to allow the molten kneaded mass to foam in a tubular shape. The tubular multilayer foamed product was hauled at a rate of 7.0 m/min, while being cooled, and cut in the extrusion direction and opened to obtain a multilayer foamed body.

The concrete conditions for cooling the multilayer tubular foamed product were as follows. Thus, the multilayer tubular foamed product was cooled by blowing air on the inside surface of the tubular foamed product immediately after extrusion at a rate of 0.4 $m^3$/min (23° C., 1 atm) while blowing air around the outside thereof at a rate of 0.85 $m^3$/min (23° C., 1 atm) and by sliding the multilayer tubular foamed product over a mandrel of a cooling device adjusted to 5° C. and having a diameter of 333 mm, thereby obtaining the multilayer foamed body in which the polypropylene resin layer having a thickness of 30 μm was laminated on the foamed layer through the adhesive layer having a thickness of 20 μm. The physical properties of the multilayer foamed body are shown in Table 3.

The thus obtained multilayer foamed body was thermoformed in the same manner as that in Example 1 to obtain a multilayer foamed molded article. Results of the evaluation of the moldability and evaluation of the multilayer foamed molded article are shown in Table 3.

Example 6

Two, first and second extruders having inside diameters of 90 mm and 120 mm were connected in tandem and used for the preparation of a foamed layer. Thus, polylactic acid resin B and a cell controlling agent (kind and amount are shown in Table 3) were fed to the first extruder and heated, fused and kneaded, to which a blowing agent (kind and amount are shown in Table 3) was then fed under a pressure and kneaded to obtain a molten kneaded mass. The kneaded mass was then fed to the second extruder connected to the first extruder and cooled therein to 170° C. and extruded through a circular die having a diameter of 135 mm and a lip clearance of 0.5 mm and to allowed to foam at a blow-up ratio of 2.5 in a tubular form. The tubular foamed product was hauled at a rate of 4.3 m/min, while being cooled, and cut in the extrusion direction and opened to obtain a foamed layer (foamed sheet).

The concrete conditions for cooling the tubular foamed product were as follows. Thus, the tubular foamed product was cooled by blowing air on the inside surface of the tubular foamed product immediately after extrusion at a rate of 0.4 $m^3$/min (23° C., 1 atm) while blowing air around the outside thereof at a rate of 0.85 $m^3$/min (23° C., 1 atm) and by sliding the tubular foamed product over a mandrel of a cooling device adjusted to 5° C. and having a diameter of 333 mm, thereby obtaining the foamed layer (foamed sheet). The obtained foamed layer was aged at ambient temperature and pressure for 40 days to adjust the pressure inside thereof.

The foamed layer was then laminated, using a heated roll at 210° C., on an unstretched film (total thickness: 40 μm, thickness of adhesive layer: 10 μm) composed of a substrate layer, as a resin layer, of polyethylene terephthalate copolymer (PETG6763 manufactured by Eastman Chemical Inc.) and an adhesive layer of an ethylene-vinyl acetate copolymer adhesive agent such that the adhesive layer was in contact with the foamed layer. The thus obtained multilayer foamed body had physical properties shown in Table 3.

The obtained multilayer foamed body was thermoformed in the same manner as that in Example 1 to obtain a multilayer foamed molded article. Results of the evaluation of the moldability and evaluation of the multilayer foamed molded article are shown in Table 3.

Example 7

A multilayer foamed body was prepared in the same manner as that in Example 2 except that the amounts of the blowing agent and the cell controlling agent were as shown in Table 3, that the hauling speed of the multilayer tubular foamed product was 2.6 m/min and that the blow-up ratio was 2.3. The thus obtained multilayer foamed body had physical properties shown in Table 3.

The obtained multilayer foamed body was thermoformed in the same manner as that in Example 1 to obtain a multilayer foamed molded article. Results of the evaluation of the moldability and evaluation of the multilayer foamed molded article are shown in Table 3.

Example 8

A molten kneaded mass for foaming was obtained in the same manner as that in Example 2 except that Resin A was used in place of Resin B and that the kinds and amounts of the blowing agent and the cell controlling agent were changed as shown in Table 3. At the same time, Resin C was fed to another extruder, heated, fused and kneaded to obtain a melt for forming a resin layer. The thus obtained molten kneaded mass for foaming and melt for forming a resin layer were fed to a circular die for coextrusion having a diameter of 110 mm and a lip clearance of 0.5 mm and coextruded through the circular die at a blow-up ratio of 3.3 such that the melt for forming a resin layer flowed outside and inside a flow of the molten kneaded mass for foaming, thereby to allow the molten kneaded mass to foam in a tubular shape. The tubular multilayer foamed product was then passed, while the interior surface thereof was in a softened, fuse-bondable state, between rolls and hauled at a speed of 2.5 m/min so that the interior surface thereof was fuse-bonded together. This was cut in the transverse direction to obtain a multilayer foamed body in the form of plate. The physical properties of the multilayer foamed body are shown in Table 3.

The obtained multilayer foamed body was maintained in an oven at 70° C. for 1 hour and thereafter evaluated for its appearance, heat resistance and strength. The results are as follows.

The multilayer foamed body had uniform surface gloss and excellent appearance. The foamed body did not deform even when it was heated at 90° C. for 5 minutes in an oven. Thus, heat resistance was also good. When a plate test piece with a length of 120 cm and a width of 50 cm was cut from the foamed body and supported on the underside at its opposite longitudinal end portions (distance between the fulcrums: 110 cm), almost no deflection under its own weight was observed. Thus, the mechanical strength of the foamed body was excellent.

Comparative Example 1

Two, first and second extruders having inside diameters of 90 mm and 120 mm were connected in tandem and used for the preparation of a foamed layer. Thus, polylactic acid resin B and a cell controlling agent (kind and amount are shown in Table 4) were fed to the first extruder and heated, fused and kneaded, to which a blowing agent (kind and amount are shown in Table 4) was then fed under a pressure and kneaded to obtain a molten kneaded mass. The kneaded mass was then fed to the second extruder connected to the first extruder and cooled therein to 169° C. and extruded through a circular die having a diameter of 135 mm and a lip clearance of 0.5 mm and allowed to foam at a blow-up ratio of 2.5 in a tubular form. The tubular foamed product was hauled at a rate of 4.2 m/min, while being cooled, and cut in the extrusion direction and opened to obtain a foamed layer (foamed sheet).

The concrete conditions for cooling the tubular foamed product were as follows. Thus, the tubular foamed product was cooled by blowing air on the inside surface of the tubular foamed product immediately after extrusion at a rate of 0.4 m$^3$/min (23° C., 1 atm) while blowing air around the outside thereof at a rate of 0.9 m$^3$/min (23° C., 1 atm) and by sliding the tubular foamed product over a mandrel of a cooling device adjusted to 5° C. and having a diameter of 333 mm, thereby obtaining the foamed layer (foamed sheet).

The obtained foamed sheet was thermoformed in the same manner as that in Example 1 to obtain a foamed molded article. Results of the evaluation of the moldability and evaluation of the foamed molded article are shown in Table 4.

Comparative Example 2

A foamed layer (foamed sheet) was obtained in the same manner as that in Example 1 except that a mixture of 25 parts by weight of Resin A and 75 parts by weight of polylactic acid resin D was used in place of Resin B, that the kinds and amounts of the blowing agent and the cell controlling agent were changed as shown in Table 4, and that the temperature of the resin was adjusted at 167° C. Next, a resin layer was formed on the foamed sheet in the same manner as that in Example 1. The thus obtained multilayer foamed body was evaluated in the same manner as that in Example 1 to give the results shown in Table 4.

The obtained multilayer foamed body was thermoformed in the same manner as that in Example 1 to obtain a multilayer foamed molded article. Results of the evaluation of the moldability and evaluation of the multilayer foamed molded article are shown in Table 4.

Comparative Example 3

A multilayer foamed body was prepared in the same manner as that in Example 2 except that the hauling speed of the tubular foamed product was 9.0 m/min and that the blow-up ratio was 3.7. Properties of the obtained multilayer foamed body are shown in Table 4.

The obtained multilayer foamed body was thermoformed in the same manner as that in Example 1 to obtain a multilayer foamed molded article. Results of the evaluation of the moldability and evaluation of the multilayer foamed molded article are shown in Table 4.

Comparative Example 4

A multilayer foamed body was prepared in the same manner as that in Example 2 except that polylactic acid resin A was used in place of polylactic acid resin B, that the amounts of the blowing agent and the cell controlling agent were as shown in Table 4, that a coextrusion circular die having a diameter of 145 mm and a lip clearance of 0.5 mm was used, and that the hauling speed of the tubular multilayer foamed product was 1.7 m/min and that the blow-up ratio was 2.3. Properties of the obtained multilayer foamed body are shown in Table 4.

The obtained multilayer foamed body was thermoformed in the same manner as that in Example 1 to obtain a multilayer foamed molded article. Results of the evaluation of the moldability and evaluation of the multilayer foamed molded article are shown in Table 4.

Comparative Example 5

A multilayer foamed body was prepared in the same manner as that in Example 2 except that the kind and the amount of the blowing agent and the amount of the cell controlling agent were as shown in Table 4, that the hauling rate of the tubular multilayer foamed product was 2.5 m/min, and that the blow-up ratio was 2.3. Properties of the obtained multilayer foamed body are shown in Table 4.

The obtained multilayer foamed body was thermoformed in the same manner as that in Example 1 to obtain a multilayer foamed molded article. Results of the evaluation of the moldability and evaluation of the multilayer foamed molded article are shown in Table 4.

TABLE 3

|  |  |  | Example 1 | Example 2 | Example 3 | Example 4 |
|---|---|---|---|---|---|---|
| Production Conditions | Blowing agent (Numerals indicate molar ratio) | — | n-butane 70 i-butane 30 | n-butane 70 i-butane 30 | n-butane 70 i-butane 30 | n-butane 70 i-butane 30 |
|  | Amount of blowing agent | wt. % | 2.5 | 2.5 | 2.5 | 2.5 |
|  | Cell controlling agent | — | talc | talc | talc | talc |
|  | Amount of cell controlling agent | wt. % | 0.2 | 1.2 | 3.0 | 1.2 |
| Resin Layer | Both sides or one side | — | one side | one side | both sides | one side |
|  | Lamination method | — | heat lamination | coextrusion | coextrusion | extrusion lamination |
|  | Kind | — | biaxially stretched PLA composite film | PLA | PLA | PLA |
|  | Thickness | μm | 30 | 25 | each side 25 | 100 |
| Foamed Layer | Apparent density | kg/m$^3$ | 183 | 205 | 235 | 200 |
|  | Thickness | mm | 1.4 | 1.5 | 1.3 | 1.6 |
|  | Closed cell content | % | 88 | 87 | 82 | 86 |
|  | Z | mm | 0.50 | 0.26 | 0.15 | 0.25 |
|  | Z/X | — | 0.52 | 0.51 | 0.40 | 0.52 |
|  | Z/Y | — | 0.45 | 0.47 | 0.39 | 0.49 |
|  | $\Delta H_{exo: 2° C./min}$ | J/g | 35.8 | 27.6 | 20.4 | 28.0 |
|  | $\Delta H_{endo: 2° C./min}$ | J/g | 34.2 | 34.6 | 34.4 | 34.8 |
|  | $\Delta H_{endo: 2° C./min} - \Delta H_{exo: 2° C./min}$ | J/g | 3.4 | 6.9 | 14.0 | 6.8 |
|  | $\Delta H_{exo: 10° C./min}$ | J/g | 31.3 | 33.3 | 34.9 | 33.4 |
|  | Melt tension | cN | 9 | 6 | 6 | 6 |
| Thickness of multilayer foamed body |  | mm | 1.4 | 1.5 | 1.6 | 1.7 |
| Multilayer Foamed Molded Article | Moldability | — | ○ | ○ | ○ | ○ |
|  | $\Delta H_{exo: 2° C./min}$ | J/g | 1.5 | 1.0 | 0 | 1.0 |
|  | $\Delta H_{endo: 2° C./min} - \Delta H_{exo: 2° C./min}$ | J/g | 32.7 | 33.4 | 34.3 | 34.0 |
|  | Appearance | — | ○ | ○ | ○ | ○ |
|  | Ability to improve heat resistance | — | ○ | ○ | ○ | ○ |
|  | Strength | — | ○ | ○ | ○ | ○ |

|  |  |  | Example 5 | Example 6 | Example 7 | Example 8 |
|---|---|---|---|---|---|---|
| Production Conditions | Blowing agent (Numerals indicate molar ratio) | — | n-butane 70 i-butane 30 | n-butane 70 i-butane 30 | n-butane 70 i-butane 30 | n-butane 70 i-butane 30 |
|  | Amount of blowing agent | wt. % | 1.5 | 2.2 | 1.8 | 4.0 |
|  | Cell controlling agent | — | talc | talc | talc | talc |
|  | Amount of cell controlling agent | wt. % | 1.2 | 1.2 | 1.5 | 0.1 |
| Resin Layer | Both sides or one side | — | one side | one side | one side | one side |
|  | Lamination method | — | coextrusion | heat lamination | coextrusion | coextrusion |
|  | Kind | — | polypropylene | copolyester composite film | PLA | PLA |
|  | Thickness | μm | 50 | 40 | 25 | each side 25 |
| Foamed Layer | Apparent density | kg/m$^3$ | 420 | 200 | 250 | 90 |
|  | Thickness | mm | 1.0 | 1.5 | 2.0 | 6.0 |
|  | Closed cell content | % | 85 | 86 | 85 | 92 |
|  | Z | mm | 0.10 | 0.38 | 0.20 | 0.80 |
|  | Z/X | — | 0.32 | 0.59 | 0.75 | 1.20 |
|  | Z/Y | — | 0.27 | 0.58 | 0.70 | 1.40 |
|  | $\Delta H_{exo: 2° C./min}$ | J/g | 28.0 | 28.0 | 27.5 | 24.2 |
|  | $\Delta H_{endo: 2° C./min}$ | J/g | 34.5 | 34.7 | 34.7 | 34.6 |
|  | $\Delta H_{endo: 2° C./min} - \Delta H_{exo: 2° C./min}$ | J/g | 6.5 | 6.7 | 7.2 | 10.4 |
|  | $\Delta H_{exo: 10° C./min}$ | J/g | 33.0 | 33.5 | 34.0 | 31.0 |
|  | Melt tension | cN | 6 | 6 | 6 | 9 |
| Thickness of multilayer foamed body |  | mm | 1.1 | 1.6 | 2.0 | 6.1 |
| Multilayer Foamed Molded Article | Moldability | — | ○ | ○ | ○ | — |
|  | $\Delta H_{exo: 2° C./min}$ | J/g | 1.0 | 0.5 | 0.8 | 1.5 |
|  | $\Delta H_{endo: 2° C./min} - \Delta H_{exo: 2° C./min}$ | J/g | 33.4 | 34.0 | 34.0 | 33.2 |
|  | Appearance | — | ○ | ○ | ○ | — |
|  | Ability to improve heat resistance | — | ○ | ○ | ○ | — |
|  | Strength | — | ○ | ○ | ○ | — |

In Table 3, n-butane indicates normal butane, i-butane indicates isobutane and "part by weight" is per 100 parts by weight of the base resin. PLA is abbreviation of polylactic acid.

Evaluation of Appearance:

A foamed molded article is observed with naked eyes. The appearance is evaluated according to the following ratings:

TABLE 4

|  |  |  | Comp. Ex. 1 | Comp. Ex. 2 | Comp. Ex. 3 | Comp. Ex. 4 | Comp. Ex. 5 |
|---|---|---|---|---|---|---|---|
| Production Conditions | Blowing agent (Numerals indicate molar ratio) | — | n-butane 70 i-butane 30 | n-butane 70 i-butane 30 | n-butane 70 i-butane 30 | n-butane 70 i-butane 30 | $CO_2$ 80 i-butane 30 |
|  | Amount of blowing agent | wt. % | 2.5 | 2.5 | 2.5 | 4.5 | 0.8 |
|  | Cell controlling agent | — | talc | talc | talc | talc | talc |
|  | Amount of cell controlling agent | wt. % | 1.2 | 1.2 | 1.2 | 0.05 | 3.0 |
| Resin Layer | Both sides or one side | — | — | one side | one side | one side | one side |
|  | Lamination method | — | — | heat lamination | coextrusion | coextrusion | coextrusion |
|  | Kind | — | — | biaxially stretched PLA composite film | PLA | PLA | PLA |
|  | Thickness | μm | — | 30 | 25 | 25 | 25 |
| Foamed Layer | Apparent density | kg/m³ | 205 | 245 | 205 | 101 | 510 |
|  | Thickness | mm | 1.5 | 1.3 | 1.4 | 7.5 | 1.0 |
|  | Closed cell content | % | 88 | 82 | 87 | 85 | 45 |
|  | Z | mm | 0.24 | 0.25 | 0.10 | 2.20 | 0.04 |
|  | Z/X | — | 0.50 | 0.49 | 0.14 | 0.79 | 0.75 |
|  | Z/Y | — | 0.48 | 0.46 | 0.13 | 0.70 | 0.66 |
|  | $\Delta H_{exo: 2° C./min}$ | J/g | 29.0 | 7.2 | 28.1 | 27.8 | 17.7 |
|  | $\Delta H_{endo: 2° C./min}$ | J/g | 34.4 | 8.7 | 34.4 | 34.5 | 34.7 |
|  | $\Delta H_{endo: 2° C./min} - \Delta H_{exo: 2° C./min}$ | J/g | 5.4 | 1.5 | 6.3 | 6.7 | 17.0 |
|  | $\Delta H_{exo: 10° C./min}$ | J/g | 33.2 | 8.2 | 33.5 | 30.0 | 35.0 |
|  | Melt tension | cN | 6 | 3 | 6 | 9 | 4 |
| Thickness of multilayer foamed body |  | mm | — | 1.5 | 1.4 | 7.5 | 1.0 |
| Multilayer Foamed Molded Article | Moldability | — | Δ | ○ | x | ○ | x |
|  | $\Delta H_{exo: 2° C./min}$ | J/g | 0.8 | 1.2 | 1.0 | 0 | 1.5 |
|  | $\Delta H_{endo: 2° C./min} - \Delta H_{exo: 2° C./min}$ | J/g | 33.5 | 7.6 | 33.5 | 34.5 | 33.0 |
|  | Appearance | — | ○ | ○ | ○ | x | ○ |
|  | Ability to improve heat resistance | — | ○ | x | ○ | ○ | ○ |
|  | Strength | — | x | ○ | ○ | ○ | ○ |

In Table 4, n-butane indicates normal butane, i-butane indicates isobutane and "part by weight" is per 100 parts by weight of the base resin. PLA is abbreviation of polylactic acid.

In above Examples and Comparative Examples, the measurement of the exothermic and endothermic calorific values was carried out using Shimadzu Heat Flux Differential Scanning Calorimeter DSC-50 (manufactured by SHIMADZU corporation) and a data analyzing software (Partial Area Analyzing Program version 1.52 for Shimadzu Thermoanalysis Work Station TA-60WS).

Evaluation of the strength, moldability, appearance and ability to improve heat resistance of multilayer foamed molded articles of Examples 1 to 7 and Comparative Examples 1 to 5 shown in Tables 3 and 4 are performed as follows.

Evaluation of Strength:

Water is poured in a foamed molded article (bowl). The foamed molded article is hoisted up with one hand at its bottom and at its flange portion to observe deformation thereof with naked eyes. Evaluation is according to the following ratings:

○: Almost no deflection of foamed molded article
x: Significant deflection of foamed molded article Evaluation of Moldability:

Foamed molded article is evaluated with respect to the thickness and cracks according to the following ratings:

○: Foamed molded article has uniform thickness and has no cracks in the interior and exterior walls thereof
Δ: has variation in its thickness but has no cracks in the interior and exterior walls thereof
x: Foamed molded article has cracks in the interior or exterior wall ○: Foamed molded article has uniform surface gloss
x: Surface gloss of foamed molded article is not uniform Evaluation of Ability to Improve Heat Resistance:

Hot water is poured in a foamed molded article and, then, discharged after lapse of 5 minutes. The foamed molded article is observed with naked eyes for evaluation according to the following ratings:

○: No change is observed in appearance of foamed molded article
x: Undulations are observed on exterior wall of foamed molded article

The invention claimed is:

1. A multi-layered polylactic acid resin foamed body which is a laminate comprising a polylactic acid resin foamed layer and a thermoplastic resin layer provided at least one side of said foamed layer, wherein said foamed layer has such a cell shape as to satisfy the following formulas (1) to (3):

$$0.05 < Z < 2.0 \tag{1}$$

$$0.2 < Z/X < 1.4 \tag{2}$$

$$0.2 < Z/Y < 1.7 \tag{3}$$

where X, Y and Z represent average cell diameters in the extrusion, transverse and thickness directions, respectively, in the unit of mm, wherein a difference ($\Delta H_{endo:2° C./min} - \Delta H_{exo:2° C./min}$) between an endothermic calorific value ($\Delta H_{endo:2° C./min}$) and an exothermic calorific value ($\Delta H_{endo:2° C./min}$) of said foamed layer as measured by heat flux differential scanning calorimetry at a heating rate of 2°

C./min is less than 20 J/g and wherein the endothermic calorific value ($\Delta H_{endo:2°\ C./min}$) is at least 25 J/g and the exothermic calorific value ($\Delta H_{exo:2°\ C./min}$) is at least 15 J/g.

2. A multi-layered polylactic acid resin foamed body as recited in claim 1, wherein said foamed layer has a thickness of 0.5 to 7 mm and has such a cell shape as to satisfy the following formulas (4) to (6):

$$0.05 < Z < 0.8 \quad (4)$$

$$0.2 < Z/X < 0.8 \quad (5)$$

$$0.2 < Z/Y < 0.6 \quad (6)$$

where X, Y and Z represent average cell diameters in the extrusion, transverse and thickness directions, respectively, in the unit of mm.

3. A multi-layered polylactic acid resin foamed body as recited in claim 1, wherein the foamed layer has an exothermic calorific value ($\Delta H_{exo:10°\ C./min}$), as measured by heat flux differential scanning calorimetry at a cooling rate of 10° C./min, of 20 to 45 J/g.

4. A multi-layered polylactic acid resin foamed body as recited in claim 1, wherein the foamed layer has an exothermic calorific value ($\Delta H_{exo:10°\ C./min}$), as measured by heat flux differential scanning calorimetry at a cooling rate of 10° C./min, of 25 to 40 J/g.

5. A multi-layered polylactic acid resin foamed body as recited in claim 1, wherein the foamed layer has a melt tension of at least 2 cN at 190° C.

6. A multi-layered polylactic acid resin foamed body as recited in claim 1, wherein the thermoplastic resin layer is a polyolefin resin layer.

7. A multi-layered polylactic acid resin foamed body as recited in claim 1, wherein the thermoplastic resin layer is a polyester resin layer.

8. A multi-layered polylactic acid resin foamed body which is a laminate obtained by heat treating a multi-layered polylactic acid resin foamed body according to any one of claims 1 and 2-7 at a temperature not lower than the (glass transition temperature of said foamed layer plus 5° C.) but not higher than the (glass transition temperature of said foamed layer plus 70° C.), wherein the difference ($\Delta H_{endo:2°\ C./min} - \Delta H_{exo:2°\ C./min}$) between an endothermic calorific value ($\Delta H_{endo:2°\ C./min}$) and an exothermic calorific value ($\Delta H_{exo:2°\ C./min}$) of the foamed layer of said laminate as measured by heat flux differential scanning calorimetry at a heating rate of 2° C./min is at least 25 J/g and is greater by at least 15 J/g than the difference ($\Delta H_{endo:2°\ C./min} - \Delta H_{exo:2°\ C./min}$) of the multi-layered polylactic acid resin foamed body before the heat treatment.

* * * * *

UNITED STATES PATENT AND TRADEMARK OFFICE
CERTIFICATE OF CORRECTION

| | |
|---|---|
| PATENT NO. | : 7,901,764 B2 |
| APPLICATION NO. | : 11/663630 |
| DATED | : March 8, 2011 |
| INVENTOR(S) | : Kenichi Takase et al. |

Page 1 of 1

It is certified that error appears in the above-identified patent and that said Letters Patent is hereby corrected as shown below:

Column 32, line 66 (claim 1, line 14, second line from the bottom in column 32), "$(\Delta H_{endo:2°C./min})$" should read -- $(\Delta H_{exo2° C./min})$ --

Signed and Sealed this
Twenty-fourth Day of May, 2011

David J. Kappos
*Director of the United States Patent and Trademark Office*